US012743613B2

(12) United States Patent
Hylton

(10) Patent No.: US 12,743,613 B2
(45) Date of Patent: Sep. 22, 2026

(54) THERMODYNAMIC NEURAL NETWORK

(71) Applicant: The Regents of the University of California, Oakland, CA (US)

(72) Inventor: Todd Hylton, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 1210 days.

(21) Appl. No.: 17/418,645

(22) PCT Filed: Dec. 26, 2019

(86) PCT No.: PCT/US2019/068603
§ 371 (c)(1),
(2) Date: Jun. 25, 2021

(87) PCT Pub. No.: WO2020/139964
PCT Pub. Date: Jul. 2, 2020

(65) Prior Publication Data

US 2022/0083858 A1 Mar. 17, 2022

Related U.S. Application Data

(60) Provisional application No. 62/786,243, filed on Dec. 28, 2018.

(51) Int. Cl.
*G06N 3/08* (2023.01)

(52) U.S. Cl.
CPC .................................... *G06N 3/08* (2013.01)

(58) Field of Classification Search
CPC ....................................................... G06N 3/08
See application file for complete search history.

(56) References Cited

U.S. PATENT DOCUMENTS 5,461,699 A 10/1995 Arbabi et al.
8,818,918 B2 * 8/2014 Lin ......................... G06N 5/01
707/690

(Continued)

OTHER PUBLICATIONS

Panigrahy, R. et al., "Convergence Results for Neural Networks via Electrodynamics." Dec. 6, 2018 [retrieved on Feb. 20, 2020]. https://arxiv.org/abs/1702.00458. 31 pages.

(Continued)

*Primary Examiner* — Jennifer N Welch
*Assistant Examiner* — Quoc Ly Phu Phung
(74) *Attorney, Agent, or Firm* — FisherBroyles, LLP

(57) ABSTRACT

A method may include training a thermodynamic neural network having a plurality of nodes interconnected by a plurality of edges. The training of the thermodynamic neural network may include determining an optimal organization of the thermodynamic neural network in which one or more charges are transferred through the thermodynamic neural network with a minimum quantity of residual charge remaining at each of the plurality of nodes. The trained thermodynamic neural network may be deployed to perform a cognitive task. The cognitive task may include the trained thermodynamic neural network receiving a first set of charges corresponding to an input sample and outputting a second set of charges corresponding to a decision associated with the input sample. Related systems and articles of manufacture, including computer program products, are also provided.

20 Claims, 12 Drawing Sheets

(56) References Cited

U.S. PATENT DOCUMENTS

| | | | | |
|---|---|---|---|---|
| 2006/0227978 | A1* | 10/2006 | Truong | H04M 9/082 381/66 |
| 2009/0094012 | A1* | 4/2009 | Clark | G16B 20/30 703/11 |
| 2012/0116735 | A1* | 5/2012 | Guedon | G06F 30/23 703/2 |
| 2014/0344200 | A1 | 11/2014 | Schie | |
| 2015/0106316 | A1* | 4/2015 | Birdwell | G06N 3/0499 706/33 |
| 2015/0269124 | A1* | 9/2015 | Hamze | G06N 20/00 703/2 |
| 2016/0299795 | A1* | 10/2016 | Kagami | G06F 9/5027 |
| 2017/0300614 | A1* | 10/2017 | Raphael | G16B 5/00 |
| 2018/0322398 | A1* | 11/2018 | Mbale | G06F 18/285 |
| 2018/0373978 | A1* | 12/2018 | Yu | G06N 3/0495 |
| 2019/0018922 | A1* | 1/2019 | Gao | G16B 5/30 |
| 2019/0051398 | A1* | 2/2019 | Zankowski | G06N 20/00 |
| 2019/0319477 | A1* | 10/2019 | Manikfan | H02J 7/35 |
| 2021/0091421 | A1* | 3/2021 | Yazami | H01M 10/44 |

OTHER PUBLICATIONS

International Search Report and Written Opinion of PCT/US2019/068603, mailed Mar. 3, 2020 (Mar. 3, 2020), 12 Pages.

* cited by examiner

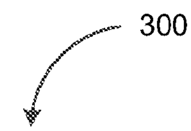

302

TRAIN THERMODYNAMIC NEURAL NETWORK INCLUDING BY DETERMINING OPTIMAL ORGANIZATION OF THERMODYNAMIC NEURAL NETWORK IN WHICH ONE OR MORE CHARGES ARE TRANSFERRED THROUGH THERMODYNAMIC NEURAL NETWORK WITH MINIMAL QUANTITY OF RESIDUAL CHARGE REMAINING AT EACH OF PLURALITY OF NODES INCLUDED IN THERMODYNAMIC NEURAL NETWORK

304

DEPLOY THERMODYNAMIC NEURAL NETWORK TO PERFORM COGNITIVE TASK IN WHICH FIRST SET OF CHARGES CORRESPONDING TO INPUT SAMPLE IS TRANSFERRED THROUGH THERMODYNAMIC NEURAL NETWORK AND SECOND SET OF CHARGES CORRESPONDING TO DECISION ASSOCIATED WITH INPUT SAMPLE IS OUTPUT BY TRAINED THERMODYNAMIC NEURAL NETWORK

FIG. 3

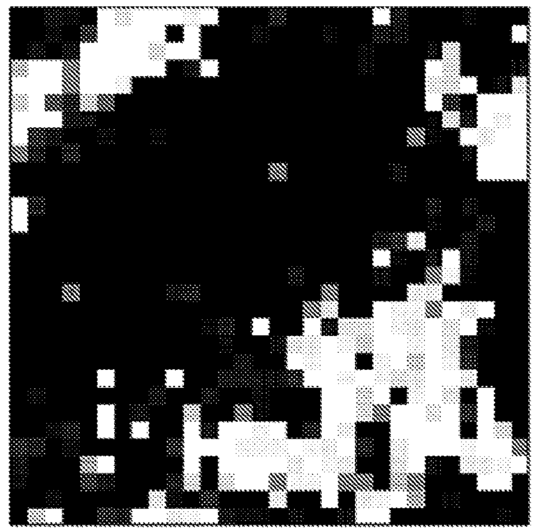
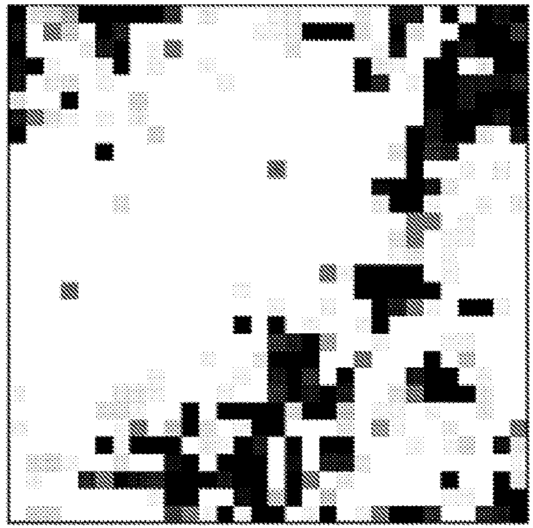
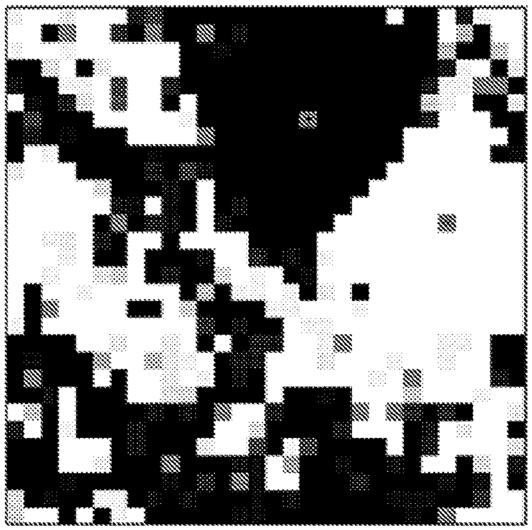
FIG. 4D

THERMODYNAMIC NEURAL NETWORK

RELATED APPLICATION

This application is a national stage entry of Patent Cooperation Treaty Application No. PCT/US2019/068603 filed Dec. 26, 2019, entitled "THERMODYNAMIC NEURAL NETWORK," which claims priority to U.S. Provisional Application No. 62/786,243 filed on Dec. 28, 2018, entitled "THERMODYNAMIC NEURAL NETWORK." The disclosures of which are incorporated herein by reference in their entirety.

TECHNICAL FIELD

The subject matter described herein relates generally to machine learning and more specifically to the implementation of a thermodynamic neural network.

BACKGROUND

Machine learning models may be trained to perform a variety of cognitive tasks including, for example, object identification, natural language processing, information retrieval, and speech recognition. A deep learning model such as, for example, a neural network, may be trained to perform a classification task by at least assigning input samples to one or more categories. The deep learning model may be trained to perform the classification task based on training data that has been labeled in accordance with the known category membership of each sample included in the training data. Alternatively and/or additionally, the deep learning model may be trained to perform a regression task. The regression task may require the deep learning model to predict, based at least on variations in one or more independent variables, corresponding changes in one or more dependent variables.

SUMMARY

Systems, methods, and articles of manufacture, including computer program products, are provided for a thermodynamic neural network. In some example embodiments, there is provided a system that includes at least one processor and at least one memory. The at least one memory may include program code that provides operations when executed by the at least one processor. The operations may include: training a thermodynamic neural network having a plurality of nodes interconnected by a plurality of edges, the training of the thermodynamic neural network including determining an optimal organization of the thermodynamic neural network in which one or more charges are transferred through the thermodynamic neural network with a minimum quantity of residual charge remaining at each of the plurality of nodes; and deploying the trained thermodynamic neural network to perform a cognitive task, the cognitive task including the trained thermodynamic neural network receiving a first set of charges corresponding to an input sample and outputting a second set of charges corresponding to a decision associated with the input sample.

In some variations, one or more features disclosed herein including the following features can optionally be included in any feasible combination. The plurality of nodes may include a first node, a second node, a third node, a fourth node, and a fifth node.

In some variations, the optimal organization may be determined by at least determining a state of the first node.

A first charge from the second node and a second charge from the third node may be transferred through the first node when the first node is in a first state. A third charge from the fourth node and a fourth charge from the fifth node may be transferred through the first node when the first node is in a second state.

In some variations, the optimal organization may include the first node in the first state based at least on a first magnitude of the first charge and the second charge being greater than a second magnitude of the third charge and fourth charge.

In some variations, the optimal organization may include the first node in the first state further based on the first charge and the second charge having opposite polarities.

In some variations, the optimal organization may include the first node in the first state further based at least on a first quantity of residual charges that remains after the transfer of the first charge and the second charge through the first node being less than a second quantity of residual charges that remains after the transfer of the third charge and the fourth charge through the first node. The first quantity of residual charges may be determined based at least on a first weight and/or a second weight. The first weight may be associated with a first edge of the plurality of edges that interconnects the first node and the second node. The second weight may be associated with a second edge of the plurality of edges that interconnects the first node and the third node. The first charge may correspond to a first product of the first weight and a state of the second node. The second charge may correspond to a second product of the second weight and a state of the third node. The first quantity of residual charges may include a first portion of the first charge and/or a second portion of the second charge that failed to transfer through the first node.

In some variations, the optimal organization of the thermodynamic neural network may be further determined by at least adjusting, based at least on the first quantity of residual charges, the first weight and/or the second weight. The first weight and the second weight may be adjusted independently. The adjusting of the first weight and/or the second weight may include decreasing a magnitude of the first weight and/or the second weight by multiplying the first weight and/or the second weight by a correction factor.

In some variations, the first quantity of residual charges may be an error that is minimized by the adjusting of the first weight and/or the second weight. The first weight and/or the second weight may be adjusted such that a distribution of weights across the thermodynamic neural network conforms to a Boltzmann distribution. The error may be minimized without adjusting a third weight associated with a third edge interconnecting the first node and the fourth node or a fourth weight associated with a fourth edge interconnecting the first node and the fifth node.

In some variations, the optimal organization of the thermodynamic neural network may be determined by at least applying a Markov Chain Monte Carlo. The Markov Chain Monte Carlo may be applied to change a respective state of each of the plurality of nodes in the thermodynamic neural network until the respective states of the plurality of nodes conform to a Boltzmann distribution.

In some variations, the plurality of nodes in the thermodynamic neural network may include at least one node that is coupled to an external node providing the first set of charges.

In some variations, the plurality of nodes in the thermodynamic neural network may include at least one node that is coupled to an external node receiving the second set of charges.

In some variations, the optimal organization of the thermodynamic neural network may be an antiferromagnetic network configuration interconnecting nodes having opposite polarities.

In some variations, the cognitive task may include a classification task and/or a regression task, and wherein the second set of charges corresponds to a classification label and/or a predicted value.

In another aspect, there is provided a method for a thermodynamic neural network. The method may include: training a thermodynamic neural network having a plurality of nodes interconnected by a plurality of edges, the training of the thermodynamic neural network including determining an optimal organization of the thermodynamic neural network in which one or more charges are transferred through the thermodynamic neural network with a minimum quantity of residual charge remaining at each of the plurality of nodes; and deploying the trained thermodynamic neural network to perform a cognitive task, the cognitive task including the trained thermodynamic neural network receiving a first set of charges corresponding to an input sample and outputting a second set of charges corresponding to a decision associated with the input sample.

In some variations, one or more features disclosed herein including the following features can optionally be included in any feasible combination.

The plurality of nodes may include a first node, a second node, a third node, a fourth node, and a fifth node.

In some variations, the optimal organization may be determined by at least determining a state of the first node. A first charge from the second node and a second charge from the third node may be transferred through the first node when the first node is in a first state. A third charge from the fourth node and a fourth charge from the fifth node may be transferred through the first node when the first node is in a second state.

In some variations, the optimal organization may include the first node in the first state based at least on a first magnitude of the first charge and the second charge being greater than a second magnitude of the third charge and fourth charge.

In some variations, the optimal organization may include the first node in the first state further based on the first charge and the second charge having opposite polarities.

In some variations, the optimal organization may include the first node in the first state further based at least on a first quantity of residual charges that remains after the transfer of the first charge and the second charge through the first node being less than a second quantity of residual charges that remains after the transfer of the third charge and the fourth charge through the first node. The first quantity of residual charges may be determined based at least on a first weight and/or a second weight. The first weight may be associated with a first edge of the plurality of edges that interconnects the first node and the second node. The second weight may be associated with a second edge of the plurality of edges that interconnects the first node and the third node. The first charge may correspond to a first product of the first weight and a state of the second node. The second charge may correspond to a second product of the second weight and a state of the third node. The first quantity of residual charges may include a first portion of the first charge and/or a second portion of the second charge that failed to transfer through the first node.

In some variations, the optimal organization of the thermodynamic neural network may be further determined by at least adjusting, based at least on the first quantity of residual charges, the first weight and/or the second weight. The first weight and the second weight may be adjusted independently. The adjusting of the first weight and/or the second weight may include decreasing a magnitude of the first weight and/or the second weight by multiplying the first weight and/or the second weight by a correction factor.

In some variations, the first quantity of residual charges may be an error that is minimized by the adjusting of the first weight and/or the second weight. The first weight and/or the second weight may be adjusted such that a distribution of weights across the thermodynamic neural network conforms to a Boltzmann distribution. The error may be minimized without adjusting a third weight associated with a third edge interconnecting the first node and the fourth node or a fourth weight associated with a fourth edge interconnecting the first node and the fifth node.

In some variations, the optimal organization of the thermodynamic neural network may be determined by at least applying a Markov Chain Monte Carlo. The Markov Chain Monte Carlo may be applied to change a respective state of each of the plurality of nodes in the thermodynamic neural network until the respective states of the plurality of nodes conform to a Boltzmann distribution.

In some variations, the plurality of nodes in the thermodynamic neural network may include at least one node that is coupled to an external node providing the first set of charges.

In some variations, the plurality of nodes in the thermodynamic neural network may include at least one node that is coupled to an external node receiving the second set of charges.

In some variations, the optimal organization of the thermodynamic neural network may be an antiferromagnetic network configuration interconnecting nodes having opposite polarities.

In some variations, the cognitive task may include a classification task and/or a regression task, and wherein the second set of charges corresponds to a classification label and/or a predicted value.

In another aspect, there is provided a computer program product that includes a non-transitory computer readable medium storing instructions. The instructions may cause operations when executed by at least one data processor. The operations may include: training a thermodynamic neural network having a plurality of nodes interconnected by a plurality of edges, the training of the thermodynamic neural network including determining an optimal organization of the thermodynamic neural network in which one or more charges are transferred through the thermodynamic neural network with a minimum quantity of residual charge remaining at each of the plurality of nodes; and deploying the trained thermodynamic neural network to perform a cognitive task, the cognitive task including the trained thermodynamic neural network receiving a first set of charges corresponding to an input sample and outputting a second set of charges corresponding to a decision associated with the input sample.

In another aspect, there is provided an apparatus for implementing and training a residual neural network. The apparatus may include: means for training a thermodynamic neural network having a plurality of nodes interconnected by a plurality of edges, the training of the thermodynamic neural network including determining an optimal organization of the thermodynamic neural network in which one or more charges are transferred through the thermodynamic neural network with a minimum quantity of residual charge remaining at each of the plurality of nodes; and means for deploying the trained thermodynamic neural network to perform a cognitive task, the cognitive task including the trained thermodynamic neural network receiving a first set of charges corresponding to an input sample and outputting a second set of charges corresponding to a decision associated with the input sample.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts a flowchart illustrating an example of a process for implementing a thermodynamic neural network, in accordance with some example embodiments;

FIG. 4D depicts another simulation of an example of a thermodynamic neural network, in accordance with some example embodiments;

When practical, similar reference numbers denote similar structures, features, or elements.

DETAILED DESCRIPTION

Figure 1A:
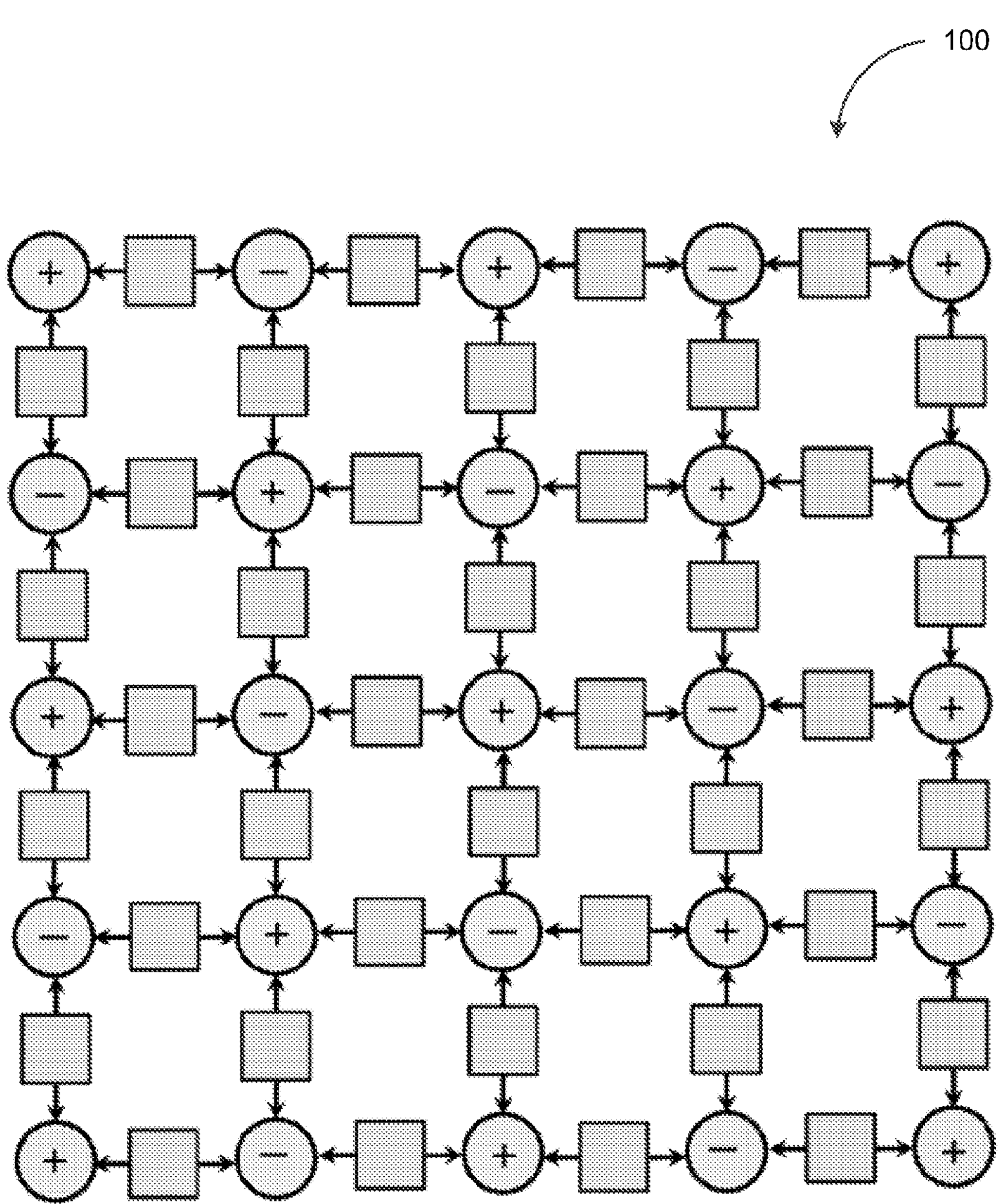
FIG. 1A depicts a block diagram illustrating an example of a thermodynamic neural network, in accordance with some example embodiments.

A conventional neural network may include a plurality of interconnected nodes organized into one or more layers including, for example, core computation layers, normalization layers, pooling layers, non-linearity layers, and/or the like. Each node in the conventional neural network may be configured to generate an output by applying, to one or more inputs, at least one weight before passing the weighted inputs through an activation function. Training a conventional neural network may include minimizing an error in the output of the neural network. Accordingly, training a conventional neural network may include determining a gradient of an error function (e.g., mean squared error (MSE), cross entropy, and/or the like) quantifying this error. The gradient of the error function may be determined by backward propagating the error in the output of the neural network. Moreover, the error in the output of the neural network may be minimized by at least updating weights applied by the nodes in the neural network until the gradient of the error function converges, for example, to a local minimum and/or another threshold value.

Although a conventional neural network may be trained to perform a variety of cognitive tasks, a conventional neural network may nevertheless be deficient in various ways. For example, the structure of a conventional neural network may be an inadequate simulacrum of natural systems, which are not necessarily organized in a static hierarchy as the nodes are in a conventional neural network. Moreover, training a conventional neural network in the aforementioned manner may be prone to failure. In particular, the training of a conventional neural network may be rendered impossible when the gradient of the error function shrinks (or grows) exponentially as the error in the output of the neural network is propagated back through the neural network.

As such, in some example embodiments, a thermodynamic neural network may be implemented to include one or more nodes configured to operate based on various thermodynamic principles. For instance, the nodes in the thermodynamic neural network may convey a first set of charges corresponding to an input sample through the thermodynamic neural network and generate, as an output of the thermodynamic neural network, a second set of charges corresponding to a decision (e.g., a classification label, a predicted value, and/or the like) associated with the input sample. Instead of training by back propagating the error in the output of the thermodynamic neural network, the thermodynamic neural network may be trained by at least updating the organization of the thermodynamic neural network including, for example, the state of the nodes, the weights associated with the edges, and/or the like. For example, the organization within the thermodynamic neural network may evolve to at least optimize the transport of the first set of charges through the thermodynamic neural network and achieve an equilibrium (e.g., a minimized energy state) across the thermodynamic neural network.

Figure 1B:
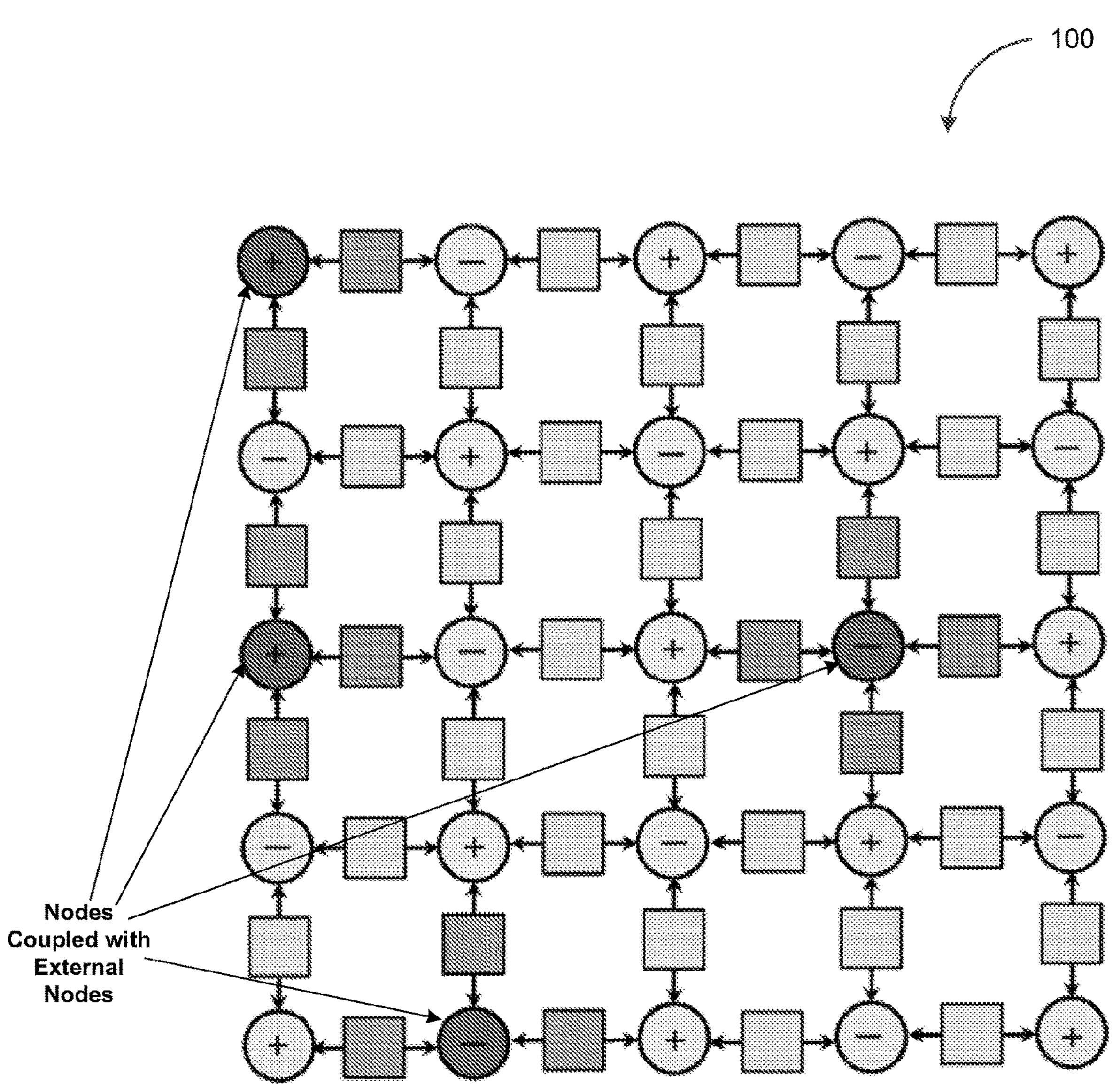
FIG. 1B depicts a block diagram illustrating an example of a thermodynamic neural network, in accordance with some example embodiments.
Figure 1C:
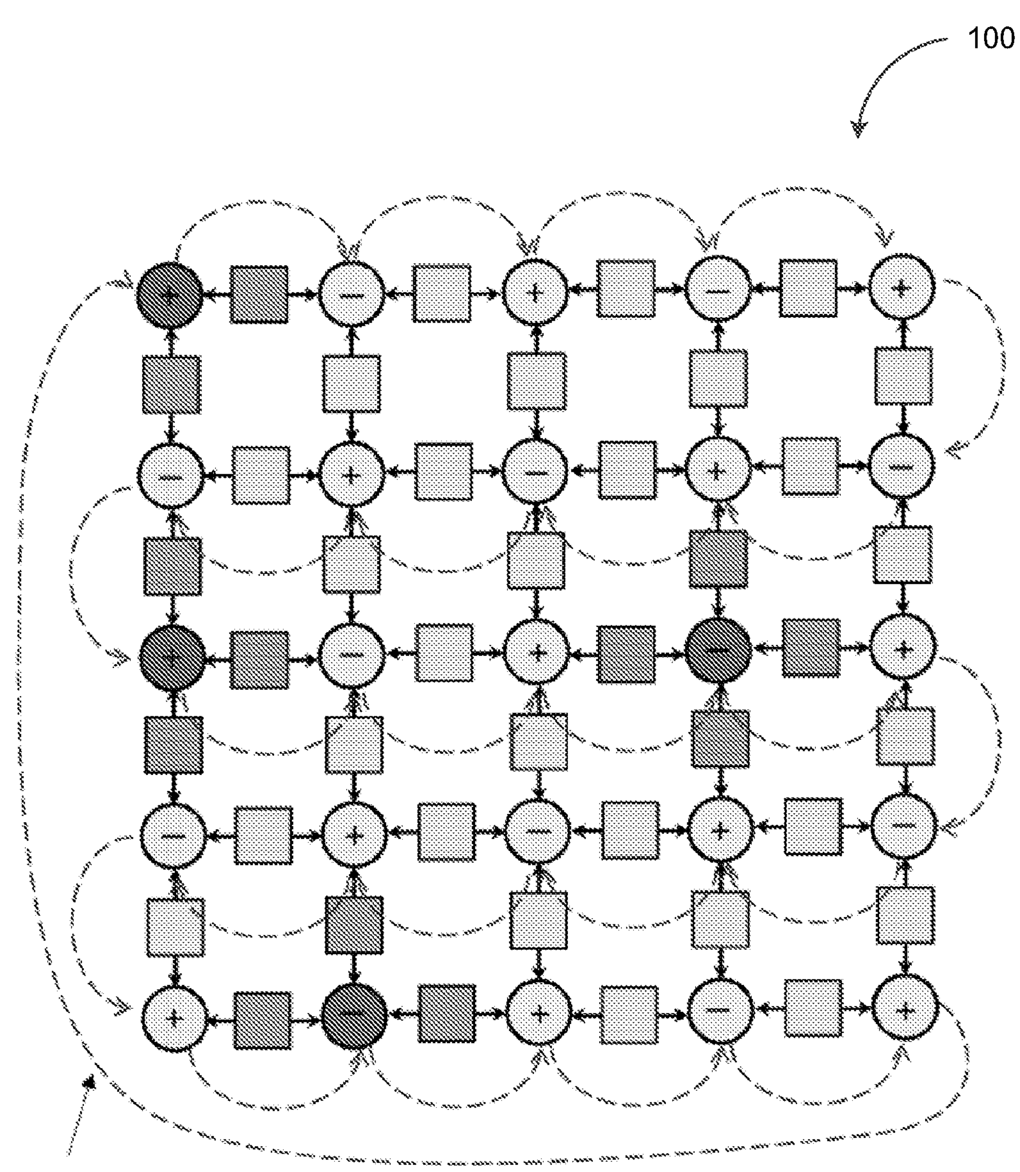
FIG. 1C depicts a block diagram illustrating an example of a thermodynamic neural network, in accordance with some example embodiments.

FIGS. 1A-C depict a block diagram illustrating an example of a thermodynamic neural network 100, in accordance with some example embodiments. Referring to FIGS. 1A-C, the thermodynamic neural network 100 may include a plurality of nodes (e.g., neurons) interconnected by bidirectional, weighted edges (e.g., synapses) capable of conveying charges between the nodes. The operations of the thermodynamic neural network 100 may be driven by interaction with external nodes forming one or more external systems. For example, FIG. 1B shows one or more of the nodes within the thermodynamic neural network 100 being coupled, also via bidirectional and weighted edges, to external nodes outside of the thermodynamic neural network 100. Charges may flow into and/or out of the thermodynamic neural network 100 via these nodes. Accordingly, the nodes in the thermodynamic neural network 100 that are coupled with external nodes may be subject to external biases and/or weights imposed by the external nodes.

In some example embodiments, the nodes in the thermodynamic neural network 100 receiving charges from one or more external nodes may be the sources of the first set of charges that is propagated through the thermodynamic neural network 100 while the nodes in the thermodynamic neural network 100 outputting charges to one or more external nodes may be the sinks for the second set of charges corresponding to a decision of the thermodynamic neural network 100 in response to the first set of charges. However, it should be appreciated that a single external node may as a sink and a source of charges traversing through the thermodynamic neural network 100. The nodes within the thermodynamic neural network 100 coupled with external nodes may be bias nodes. These bias nodes may be "current biasing" nodes and/or "voltage biasing" nodes. A "current biasing" node may have predetermined node states (e.g. $e_j=\pm 1$ with some temporal pattern of changing states) and fixed output weights. Meanwhile, a "voltage biasing" node may have predetermined node states but adaptable weights. As shown in FIG. 1B, a single bias node may be capable of polarizing the surrounding portions of the thermodynamic neural network 100 including by forcing the proximate nodes to assume an antiferromagnetic order configuration. In doing so, each bias node may communicate its input charge to other nodes in the thermodynamic neural network 100. When paired with another bias node of an opposite polarity, the resulting polarized regions may evolve to form a conducting "bridge" with large weights capable of transporting large quantities of charge through the network.

The thermodynamic neural network 100 may be implemented to exhibit a range of network topologies including, for example, a multi-dimensional grid network with near-neighbor connectivity, a probabilistically connected network, a random network, and/or the like. Unlike a conventional neural network, the nodes in the thermodynamic neural network 100 may not necessarily form a hierarchy such as, for example, the various layers that are present in a conventional neural network. Nevertheless, it should be appreciated that the thermodynamic neural network 100 may include one or more of layers such as, for example, core computation layers, normalization layers, pooling layers, non-linearity layers, and/or the like.

Figure 2A:
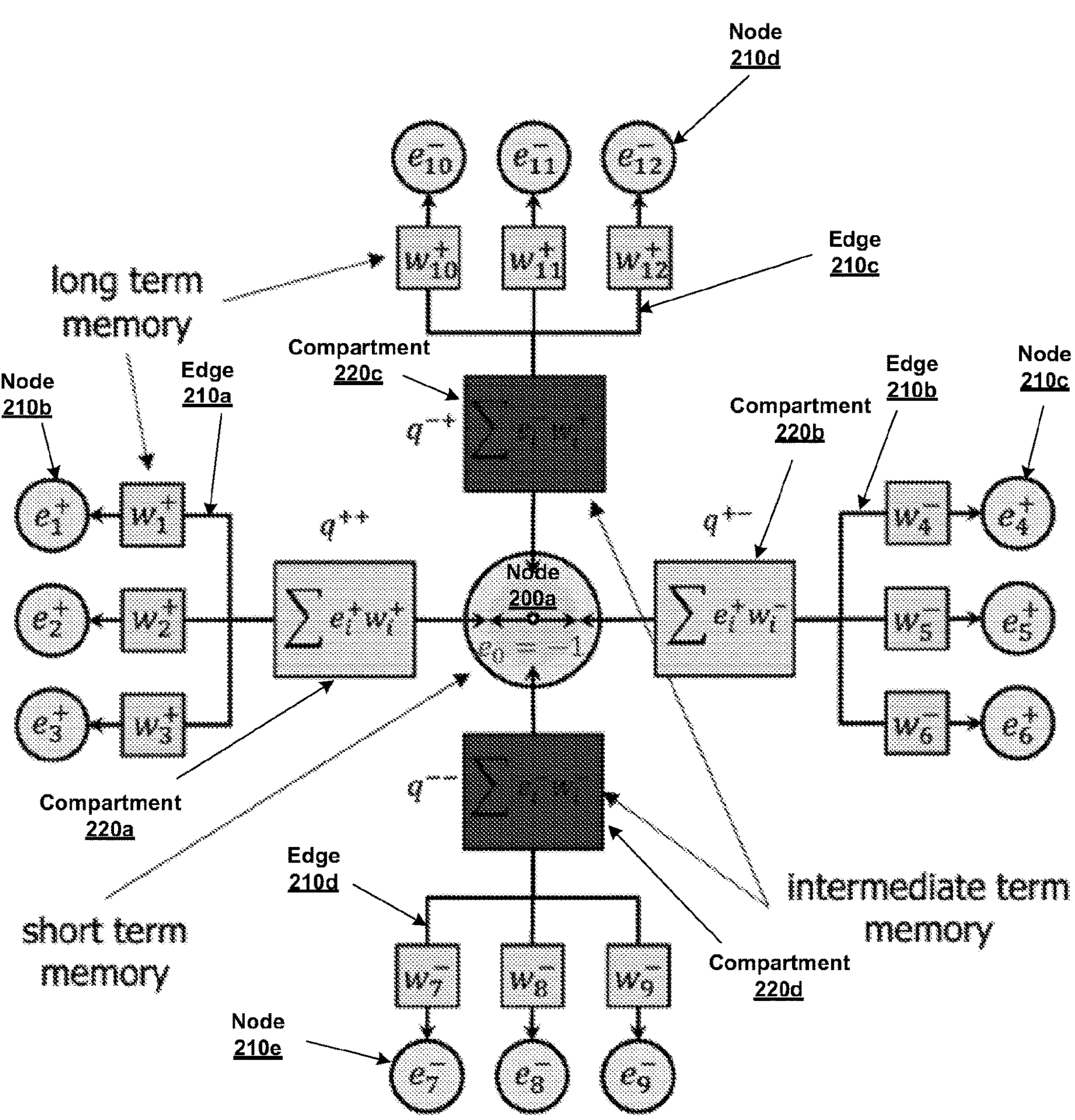
FIG. 2A depicts a block diagram illustrating an example of a node, in accordance with some example embodiments.
Figure 2B:
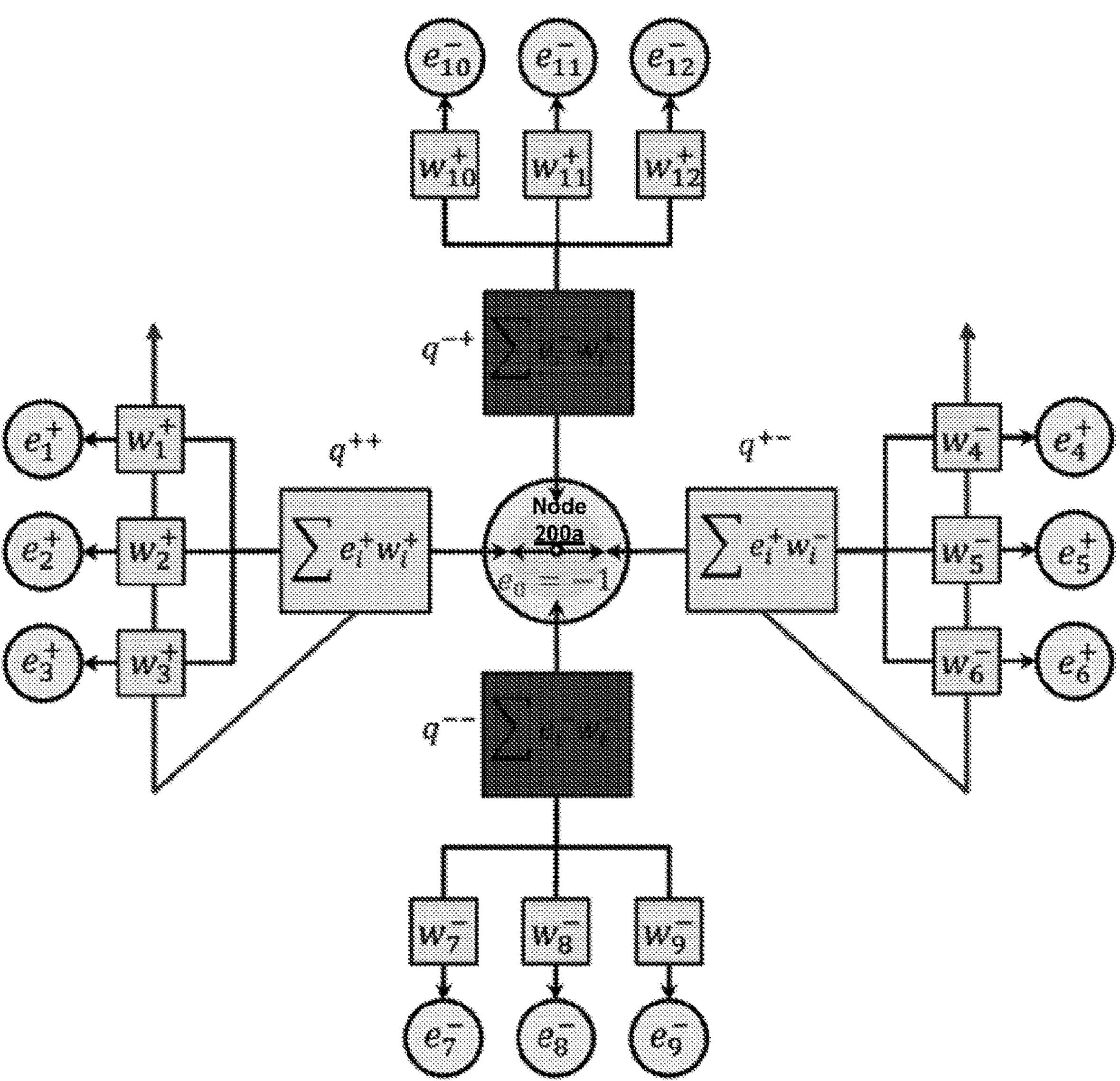
FIG. 2B depicts a block diagram illustrating an example of a node, in accordance with some example embodiments.

FIGS. 2A-B depicts a block diagram illustrating an example of a first node 200, in accordance with some example embodiments. Referring to FIGS. 1 and 2A-B, the first node 200*a* may be part of the thermodynamic neural network 100. The first node 200*a* may be interconnected with one or more other nodes within the thermodynamic neural network 100 via one or more bidirectional, weighted edges including, in the example shown in FIGS. 2A-B, a first edge 210*a*, a second edge 210*b*, a third edge 210*c*, a fourth edge 210*d*, and/or the like. The weight of an edge may correspond, for example, to its capacity to transport a charge between the nodes coupled via the edge. Alternatively and/or additionally, the first node 200*a* may be coupled with one or more external nodes outside of the thermodynamic neural network 100. For example, the first node 200*a* may be coupled with one or more external nodes providing a first set of charges corresponding to an input sample and/or receiving a second set of charges corresponding to an output of the thermodynamic neural network 100. When the first node 200*a* is coupled with the one or more external nodes, the first node 200*a* may be a bias node including, for example, a current biasing node or a voltage biasing node.

As noted, the operations of the thermodynamic neural network 100 including, for example, the first node 200*a*, may be driven by its interaction with the external nodes. For example, the organization of the thermodynamic neural network 100, including the state of node 200 and the weights of the edges associated with the first node 200*a*, may evolve in order to optimize the transport of the first set of charges through the thermodynamic neural network 100 while achieving an equilibrium (e.g., a minimized energy state) across the thermodynamic neural network 100. The organization within the thermodynamic neural network 100 may undergo iterations of updates in order to achieve an equilibrium. These updates may correspond to the training of the thermodynamic neural network 100. That is, the thermodynamic neural network 100 may be trained in accordance with various thermodynamic principles instead of conventional techniques such as backward error propagation and gradient descent. A variety of techniques, such as Markov Chain Monte Carlo, may be applied to train the thermodynamic neural network 100 and determine an optimal organization (e.g., a combination of node states and edge weights) in which the energy of the thermodynamic neural network 100 (e.g., the collective energy of the nodes in the thermodynamic neural network 100) approaches an equilibrium in which the energy of the energy of the thermodynamic neural network 100 is at a minimum, fluctuates about a minimum, or is below a threshold value. For instance, as shown in FIG. 1C, a Markov Chain Monte Carlo technique may be applied in order to continuously update the organization within the thermodynamic neural network 100 including the states of the nodes and the weights of the edges included in the thermodynamic neural network 100.

The first node 200*a* may be associated with a state corresponding to a potential of the first node 200*a*. The state of the first node 200*a* may be any discrete value or continuous value from an interval such as, for example, the interval $[-1, 1]$. For example, the first node 200*a* may take on a binary state $\{-1, 1\}$ or a ternary state $\{-1, 0, 1\}$.

In some example embodiments, the state of the first node 200$a$ may change in order to transfer a charge between pairs of nodes coupled with the first node 200$a$. For example, the state of the first node 200$a$ may change to a first state in order to transfer a charge between a second node 200$b$ coupled with the first node 200$a$ via a first edge 210$a$ and a third node 200$c$ coupled with the first node 200$a$ via a second edge 210$b$. Alternatively, the state of the first node 200$a$ may change to a second state in order to transfer a charge between a fourth node 200$d$ coupled with the first node 200$a$ via a third edge 210$c$ and a fifth node 200$e$ coupled with the first node 200$a$ via a fourth edge 210$d$. Accordingly, as shown in FIG. 1A, the state of the first node 200$a$ may serve as a form of short term memory within the thermodynamic neural network 100. For instance, the first node 200$a$ may receive, from the second node 200$b$, a first charge $$e_1^+$$

that is a product of a first state $$e_1^+$$

of the second node 200$b$ and a first weight $$w_1^+$$

of the first edge 210$a$ coupling the second node 200$b$ to the first node 200$a$. Moreover, the first node 200$a$ may receive, from the third node 200$c$, a second charge that is a product of a second state $$e_4^+$$

of the third node 200$c$ and the second weight $$w_4^+$$

of the second edge 210$b$ coupling the first node 200$a$ to the third node 200$c$. In traversing the first node 200$a$, the first charge and the second charge may be further influenced (e.g., multiplied) by the state $e_0$ of the first node 200$a$.

The organization within the thermodynamic neural network 100 may evolve, including the state of the first node 200$a$ and the respective weights of the first edge 210$a$ and the second edge 210$b$, to at least decrease the potential of the first node 200$a$ while the first set of charges (e.g., corresponding to an input sample) is conveyed through the thermodynamic neural network 100 including the first node 200$a$. The organization within the thermodynamic neural network 100 may be updated based on Boltzmann statistics. For example, the states of various nodes and the weights of the edges in the thermodynamic neural network 100 may be updated to exhibit a Boltzmann distribution. Moreover, the state of each individual node, such as the first node 200$a$, may be changed to favor connecting positive charge inputs from one edge with another edge having a negative charge input as well as to favor the flow of opposite charges in opposite direction. Accordingly, the state of the nodes in the thermodynamic neural network 100 may be changed to favor connecting nodes having opposite polarities. The resulting thermodynamic neural network 100 may exhibit an asymmetric or antiferromagnetic network configuration.

Referring again to FIGS. 2A-B, the first node 200$a$ may be associated with four compartments 220$a$, 220$b$, 220$c$, and 220$d$, each of which include one or more adjacent nodes. For example, the first compartment 220$a$ may be associated with the second node 210$b$, the second compartment 220$b$ may be associated with the third node 210$c$, the third compartment 220$c$ may be associated with the fourth node 210$d$, and the fourth compartment 220$d$ may be associated with the fifth node 210$e$. As shown in FIGS. 2A-B, each edge may deliver, to the first node 200$a$, a charge that equals the product of the potential of connected corresponding node and edge weight (e.g., $$e_1^+ w_1^+,\ e_4^+ w_4^-,\ e_7^- w_7^-,\ e_{10}^- w_{10}^+).$$

The compartments of the first node 200$a$ may be defined by the polarity of the input potential and the polarity of the weights associated with the corresponding edges, thereby serving to group similar inputs. As polarities of connected node potentials and edge weights change during network evolution, edges correspondingly change the compartments with which they are associated. Charges may accumulate, at least temporarily, at one or more of the compartments as the first set of charge propagates through the thermodynamic neural network 100. As FIG. 2A indicates, the accumulation of charges in the compartments of the first node 200$a$ may serve as a form of intermediate memory. The energies that arise due to the accumulation of charges at one or more of the compartments may be relieved (e.g., in order to achieve an equilibrium across the thermodynamic neural network 100) by transporting at least a portion the accumulated charge through the first node 200$a$.

The charges accumulated in the compartments of the neuron 200 may not relieved simultaneously. Instead, the state of the first node 200$a$ may change in order to select a pair of compartments having complementary potentials. Moreover, the charges accumulated in the selected compartments may be transferred through the first node 200$a$, although not necessarily entirely at once. As noted, the charge accumulated in the selected compartments may not be relieved entirely at once. The residual charges that remains in a compartment may be relieved when the organization of the thermodynamic neural network 100 is subsequently updated to again select the same compartment or dissipated by at least adjusting (e.g., based on Boltzmann statistics) the weights associated with the corresponding edge. It should be appreciated that the organization of the thermodynamic neural network 100 may be updated by adjusting some but not all of the weights of the edges included in the thermodynamic neural network 100. For example, the update may include adjusting the weights associated with the selected compartments but not the weights associated with the unselected compartments. This selective weight adjustments may preserve at least a portion of the existing knowledge in the thermodynamic neural network 100 when the thermodynamic neural network 100 is subject to new input samples. As such, the thermodynamic neural network 100 may be capable of learning continuously whereas conventional neural networks are prone to exhibit the phenomenon of catastrophic forgetting when subject to continuous training.

In some example embodiments, the charges that remain in the unselected compartments may be maintained at the unselected compartments and relieved when these compartments are selected during a subsequent update to the organization of the thermodynamic neural network 100. The energy of the first node 200*a* may correspond to the residual charges remaining in the compartments of the first node 200*a*. Accordingly, the organization of the thermodynamic neural network 100 may evolve to at least minimize the residual charges remaining in the compartments of various nodes across the thermodynamic neural network 100 including, for example, the first node 200*a*.

To further illustrate, if the first compartment 220*a* and the second compartment 220*b* are selected, a first charge $q^{++}$ accumulated at the first compartment 220*a* from the edges associated with the first compartment 220*a* may be transferred through the first node 200*a* to the second compartment 220*b* and then to the edges associated with the second compartment 220*b*. The first charge $q^{++}$ may therefore be a sum of the products of the states at the nodes associated with first compartment 220*a* and the weights of the corresponding edges associated with the first compartment 220*a* (e.g., $$\sum e_i^+ w_i^+ ).$$

Moreover, a complementary second charge $q^{+-}$ accumulated at the second compartment 220*b* from edges associated with the second compartment 220*b* may be transferred through the first node 200*a* to the first compartment 220*a* and then to the edges associated with the first compartment 220*a*. As shown in FIGS. 2A-B, the second charge $q^{+-}$ may be a sum of the products of the states at the nodes associated with second compartment 220*b* and the weights of the corresponding edges associated with the second compartment 220*b* (e.g., $$\sum e_i^+ w_i^- ).$$

Moreover, transporting the first charge $q^{++}$ at the first compartment 220*a* through the first node 200*a* may include multiplying the state or potential $e_0$ of the first node 200*a* (e.g., −1) by the first weights $$w_1^+$$

associated with the first edges 210*a*. Likewise, transporting the second charge $q^{+-}$ at the second compartment 220*b* through the first node 200*a* may include multiplying the state or potential $e_0$ of the first node 200*a* (e.g., −1) by the second weight $$w_4^+$$

associated with the second edges 210*b*.

As noted, the organization of the thermodynamic neural network 100 may evolve to favor the connection of nodes having opposite polarities and the flow of opposite charges in opposite directions. Accordingly, the first node 200*a* may have an opposite polarity as the second node 210*b*, the third node 210*c*, the fourth node 210*d*, and/or the fifth node 210*e*. Moreover, the first charge $q^{++}$ and the second charge $q^{+-}$ may have opposite polarities. It should be appreciated the flow of opposite charges in opposite direction does not cancel either charge. Instead, the thermodynamic neural network 100 is configured to preserve positive charges and negative charges flowing through the thermodynamic neural network 100. In particular, the path of the positive charges in the thermodynamic neural network 100 may be determined by the negative charges while the path of the negative charges in the thermodynamic neural network 100 may be determined by the positive charges. The preservation of opposite charges may enable the communication of a potential through the thermodynamic neural network 100 whereas the cancellation opposite charges may prevent a potential from being communicated through the thermodynamic neural network 100.

The first charge $q^{++}$ and the second charge $q^{++}$ may flow through the first node 200*a* to other nodes within the thermodynamic neural network 100 and/or external to the thermodynamic neural network 100. In the event the first charge $q^{++}$ and/or the second charge $q^{+-}$ flow out of the thermodynamic neural network 100, the first charge $q^{++}$ and/or the second charge $q^{+-}$ may form the second set of charges corresponding to a decision (e.g., a classification label, a predicted value, and/or the like) generated by the thermodynamic neural network 100 in response to the first set of charges corresponding to the input sample.

Referring again to FIGS. 1 and 2A-B, the energy of the thermodynamic dynamic neural network 100 may be expressed by Equation (1) below.

$$H_N(e, w, q) = \sum_j H_j(e_j, w_{ij}, q_{ij}) \tag{1}$$

wherein e may denote to a complete collection of nodes states $e_j$, w may denote a complete collection of edge weight states $w_{ij}$, q may denote a complete collection of edge charge states $q_{ij}$, $e_{ij}=e_i$ may denote the state of a node i that provides an input charge to another node j, $e_j=e_{ji}$ may denote the state of the node j providing an output charge to the node i, $w_{ij}\in\mathbb{R}$ may denote the weights of the edge connecting the node i with the node j, and $H_j\in\mathbb{R}$ may denote the energy of the node j used to select the state $e_j$ of the node j.

The probability of the thermodynamic neural network 100 having a particular organization (e.g., combination of node states and edge weights) may be described, as shown in Equation (2) below, in accordance with Boltzmann statistics.

$$P_N(e, w, q) = \frac{\exp(-\beta H_N(e, w, q))}{\Sigma_{e,w,q}\ \exp(-\beta H_N(e, w, q))} \tag{2}$$

A simulation of the thermodynamic neural network 100 may include applying a Markov Chain Monte Carlo technique to sample the state of the thermodynamic neural network 100 as a whole. When the node j is reached in the Markov chain, the (conditional) state of the node j (e.g., the probability $P_j$ of the node j being in a particular state $e_j$, may be sampled according to a Boltzmann distribution, as shown in Equations (3) and (4) below.

$$P_j(e_j \mid e \neq e_j, w, q) = \frac{\exp(-\beta H_j(e_j))}{Z_j} \tag{3}$$

$$Z_j = \Sigma_{e_j} \exp(-\beta H_j(e_j)) \tag{4}$$

The energy $H_j$ of the node j in the thermodynamic neural network 100 may be influenced by input voltages (e.g., the positive input voltage $$e_{ij}^{+}$$

and the negative input voltage $$e_{ij}^{-})$$

of the edges connecting the node j, for example, with the node i. The input voltages of these edges may be expressed as Equations (5) and (6) below.

$$e_{ij}^{+} = \int e_{ij} dt \text{ for } e_{ij} > 0, e_{ij}^{+} \in [0,1] \tag{5}$$

$$e_{ij}^{-} = \int e_{ij} dt \text{ for } e_{ij} < 0, e_{ij}^{-} \in [0,-1] \tag{6}$$

The integration over time may be limited with a maximum accumulation of $$e_{ij}^{\pm} = \pm 1$$

on any edge reflecting a limited states of nodes. In models where the node states are binary (i.e. $e_j = \pm 1$), the accumulation may not be necessary. Moreover, it may also be possible for a single edge may accumulate separate values for a positive charge $$e_{ij}^{+}$$

and a negative charge $$e_{ij}^{-}$$

that exist simultaneously.

Equations (7) and (8) may express the weights associated with the edges connecting the node i and the node j. As shown below, the weights may also be segregated by polarity.

$$w_{ij}^{+} = w_{ij} \text{ for } w_{ij} > 0 \tag{7}$$

$$w_{ij}^{-} = w_{ij} \text{ for } w_{ij} < 0 \tag{8}$$

Based on Equations (6)-(8) above, the charges that accumulate in each edge (e.g., $q^{-+}$, $q^{+-}$, $q^{--}$, and $q^{++}$) of the node j may be expressed as Equations (9)-(12) below.

$$q_{ij}^{++} = \int_{\substack{e_{ij}>0 \\ w_{ij}>0}} e_{ij} w_{ij} dt \cong e_{ij}^{+} \cdot w_{ij}^{+} \tag{9}$$

$$q_{ij}^{+-} = \int_{\substack{e_{ij}>0 \\ w_{ij}<0}} e_{ij} w_{ij} dt \cong e_{ij}^{+} \cdot w_{ij}^{-} \tag{10}$$

$$q_{ij}^{-+} = \int_{\substack{e_{ij}<0 \\ w_{ij}>0}} e_{ij} w_{ij} dt \cong e_{ij}^{-} \cdot w_{ij}^{+} \tag{11}$$

$$q_{ij}^{--} = \int_{\substack{e_{ij}<0 \\ w_{ij}<0}} e_{ij} w_{ij} dt \tag{12}$$

The approximations in these accumulated charges indicate that the weights of the corresponding edges may be changing during the course of the integration. In practice, charge accumulation at the compartments may be terminated when $$e_{ij}^{\pm} = \pm 1.$$

The charge and voltage that accumulates at the node j as a whole may be expressed by Equations (13) and (14) below.

$$q_j^{\pm\pm} = \sum_i q_{ij}^{\pm\pm} \tag{13}$$

$$\epsilon_j^{\pm} = \sum_i e_{ij}^{\pm} \tag{14}$$

Equation (15) below may express the energy $H_j$ of the node j. As noted, the organization of the thermodynamic neural network 100 may be evolved in order to minimize the energy across the thermodynamic neural network 100, which may include minimizing the energy of the individual nodes such as the energy $H_j$ of the node j.

$$H_j(e_j) = \frac{1}{2}\left(q_j^{++} - e_j q_j^{+-}\right)^2 + \frac{1}{2}\left(-e_j q_j^{++} + q_j^{+-}\right)^2 + \frac{1}{2}\left(q_j^{--} + e_j q_j^{-+}\right)^2 + \frac{1}{2}\left(e_j q_j^{--} + q_j^{-+}\right)^2 - \frac{1}{2}(1 - e_j)^2 \cdot \left(q_j^{++2} + q_j^{+-2}\right) - \frac{1}{2}(1 + e_j)^2 \cdot \left(q_j^{--2} + q_j^{+-2}\right) + 2\left(q_j^{++2} + q_j^{--2} + q_j^{+-2} + q_j^{-+2}\right) \tag{15}$$

The first four terms of Equation (15) may provide a measure of transfer charge efficiency of the node j. Note that the charge transfer charges may be grouped as complementary pairs $$-q_j^{++} \text{ with } q_j^{+-} \text{ and } q_j^{--} \text{ with } q_j^{-+}$$

because, as noted, the state $e_j$ of the node j may be changed to favor the selection of compartments having complementary charges to reduce the energy $H_j$ of the node j. The next two terms may reflect a penalty that is imposed for failing to match compartments having complementary charges. The last term of Equation (15) may be an optional energy offset that keeps energies positive. As Equation (15) shows, the organization of the thermodynamic neural network 100 may evolve to favor the connection of nodes having opposite polarities and the transfer of opposite charges in opposite directions. In effect, as the node j selects a state, the node j may select between a first state (e.g., $e_j<0$) to transfer the charges accumulated at a first pair of compartments $$\left(\text{e.g., } q_j^{++} \leftrightarrow q_j^{+-}\right)$$

or a second state (e.g., $e_j>0$) to transfer the charges accumulated at a second pair of compartments $$\left(\text{e, g., } q_j^{--} \leftrightarrow q_j^{-+}\right).$$

Equation (16) below may be derived by expanding and collecting the terms in Equation (15). As Equation (16) further clarify, state selection at the node j may be driven by the total quantity of charge accumulated at each pair of compartments. A large accumulation of charge $$\left(q_j^{++}, q_j^{+-}\right)$$

at the first pair of compartments may favor the first state (e.g., $e_j<0$) while a large accumulation of charge $$\left(q_j^{--}, q_j^{-+}\right)$$

at the second pair of compartments may favor the second state (e.g., $e_j>0$).

$$H_j(e_j) = \left[\left(q_j^{++} - q_j^{+-}\right)^2 - \left(q_j^{--} - q_j^{-+}\right)^2\right] \cdot e_j + 2\left(q_j^{++2} + q_j^{--2} + q_j^{+-2} + q_j^{-+2}\right) \quad (16)$$

In some example embodiments, the scale of the energy $H_j$ at the node j may be modified by multiplication by a factor to shift the energy $H_j$ upward or downward (e.g., $H_j(e_j) \rightarrow \alpha \cdot H_j(e_j)$). This shift may modify the effective temperature of the node state selection. Varying the value of α may vary the interactions between the nodes within an untrained thermodynamic neural network 100 to resemble a solid (e.g. fixed antiferromagnetic order), a liquid (e.g. continuously changing domains of antiferromagnetic order at different spatial and temporal scales), a gas (e.g., small domains of antiferromagnetic order with very short lifetimes), and a frustrated state (e.g., small domains of antiferromagnetic order that may persist over long time scales).

The dissipation of residual charges that may remain at the node j, for example, in the selected compartments of the node j, after the transfer of complementary charges through the node j may be achieved through updating the weights of the corresponding edges. In order to express this update of the weights associated with the edges, Equation (15) may be rewritten as follows.

$$H_j(e_j) = \left(\frac{1-e_j}{2}\right)^2 \cdot \left(q_j^{++} + q_j^{+-}\right)^2 + \left(\frac{1+e_j}{2}\right)^2 \cdot \left(q_j^{--} + q_j^{-+}\right)^2 + \left(\frac{1+e_j}{2}\right)^2 \cdot \left(q_j^{++} - q_j^{+-}\right)^2 +$$

-continued $$\left(\frac{1-e_j}{2}\right)^2 \cdot \left(q_j^{--} - q_j^{-+}\right)^2 + 2\left(q_j^{++2} + q_j^{--2} + q_j^{+-2} + q_j^{-+2}\right)$$

In the above reformulation of Equation (15), the first two terms may correspond to an "error" in charge transfer among a selected pair of compartments at the node j while the second two terms may correspond to the residual charges that remain at the node j subsequent to a state change at the node j selecting the pair of compartments. As noted, the change in the state of the node j may favor the selection of a pair of compartments having a large total charge $$\left(q_j^{++} - q_j^{+-} \text{ vs } q_j^{--} - q_j^{-+}\right)$$

and small residual charge $$\left(q_j^{++} + q_j^{+-} \text{ vs } q_j^{--} + q_j^{-+}\right).$$

In accordance with the reformulation of Equation (15), at least portion of the residual input charge $$f_{diss} = \left(\frac{1 \pm e_j}{2}\right)$$

held at the selected compartments of the node j may be dissipated, for example, through weight updates while a complementary portion of the total charge $$f_{res} = \left(\frac{1 \mp e_j}{2}\right)$$

may remain at the unselected compartments of the node j. These residual charges at the node j may be integrated with future inputs charges at the node j. A decision (e.g., $e_j \approx \pm 1$) to maximize the charge transfer term on the selected pair of compartments may also be a decision to store the charge at the unselected pair of compartments. These stored charges may be compartment state variables that influence future updates to the state of the node j and/or the weights of the edges associated with the node j. This ability to transfer a portion of the input charge while storing the remainder may be integral to the ability of the thermodynamic neural network 100 to create, sustain, and destroy domain walls, which in turn gives rise to an ability to carve out paths for competing charge flows through the thermodynamic neural network 100.

Referring again to Equation (15), the charge transfer terms associated with the energy $H_j$ of the node j may include $$H_j^T = \left(\frac{1-e_j}{2}\right)^2 \cdot \left(q_j^{++} + q_j^{+-}\right)^2 + \left(\frac{1+e_j}{2}\right)^2 \cdot \left(q_j^{--} + q_j^{-+}\right)^2.$$

Based on these charge transfer terms, Equations (17) and (18) below may be defined to express the error in transferring charges through the node j.

$$-\delta_j^+ = \left(\frac{1-e_j}{2}\right)\cdot\left(q_j^{++} + q_j^{+-}\right) \quad (17)$$

$$-\delta_j^- = \left(\frac{1+e_j}{2}\right)\cdot\left(q_j^{--} + q_j^{-+}\right) \quad (18)$$

It should be appreciated that a charge transfer error may arise whenever residual charges remain in the selected compartments of the node j after the charges accumulated at the selected compartments are transferred through the node j. According to some example embodiments, the organization of the thermodynamic neural network 100, for example, the weights of the edges associated with the selected compartments of the node j, may undergo updates (e.g., $w_{ij} \rightarrow w_{ij} + \Delta w_{ij}$) in order to minimize this error in future transfers of charges through the node j. Equation (19) below quantifies this effort to minimize charge transfer error through the node j.

$$H_j^T = \left(\sum_i e_{ij}^+ \cdot \Delta w_{ij}^+ + \sum_i e_{ij}^+ \cdot \Delta w_{ij}^- - \delta_j^+\right)^2 + \left(\sum_i e_{ij}^- \cdot \Delta w_{ij}^+ + \sum_i e_{ij}^- \cdot \Delta w_{ij}^- - \delta_j^-\right)^2 = 0 \quad (19)$$

Equation (19) may be reformulated, as shown below, to redistribute the charge transfer error amongst the weights of the edges associated with the node j.

$$H_j^T = \left(\sum_i \left(e_{ij}^+ \cdot \Delta w_{ij}^+ - \eta_{ij}^+\right) + \sum_i \left(e_{ij}^+ \cdot \Delta w_{ij}^- - \eta_{ij}^+\right)\right)^2 + \left(\sum_i \left(e_{ij}^- \cdot \Delta w_{ij}^+ - \eta_{ij}^-\right) + \sum_i \left(e_{ij}^- \cdot \Delta w_{ij}^- - \eta_{ij}^-\right)\right)^2 = 0$$

wherein $$\delta_j^+ = \sum_i \eta_{ij}^+ \text{ and } \delta_j^- = \sum_i \eta_{ij}^-.$$

By redistributing error as $$\eta_{ij}^\pm = \frac{e_{ij}^\pm}{\epsilon_j^\pm} \cdot \delta_j^\pm,$$

Equation (19) may be further reformulated as shown below.

$$H_j^T = \left(\sum_i e_{ij}^+ \cdot \left(\Delta w_{ij}^+ - \frac{\delta_j^+}{\epsilon_j^+}\right) + \sum_i e_{ij}^+ \cdot \left(\Delta w_{ij}^- - \frac{\delta_j^+}{\epsilon_j^+}\right)\right)^2 + \left(\sum_i e_{ij}^- \cdot \left(\Delta w_{ij}^+ - \frac{\delta_j^-}{\epsilon_j^-}\right) + \sum_i e_{ij}^- \cdot \left(\Delta w_{ij}^- - \frac{\delta_j^-}{\epsilon_j^-}\right)\right)^2 = 0$$

The above reformulation of Equation (19) indicates that a same update may be applied to each weight in a selected pair of compartments. Applying the same update (e.g., the same magnitude of change) to each weight in a selected pair of compartments may be the least biased strategy for distributing the charge error across the weights.

Under the assumption that weight updates are generally small and crossterms tend to average to zero over successive updates of the thermodynamic neural network 100, Equation (19) may be further reformulated as follows.

$$H_j^T \cong \sum_i \left(e_{ij}^+\right)^2 \cdot \left(\Delta w_{ij}^+ - \frac{\delta_j^+}{\epsilon_j^+}\right)^2 + \sum_i \left(e_{ij}^+\right)^2 \cdot \left(\Delta w_{ij}^- - \frac{\delta_j^+}{\epsilon_j^+}\right)^2 + \sum_i \left(e_{ij}^-\right)^2 \cdot \left(\Delta w_{ij}^+ - \frac{\delta_j^-}{\epsilon_j^-}\right)^2 + \sum_i \left(e_{ij}^-\right)^2 \cdot \left(\Delta w_{ij}^- - \frac{\delta_j^-}{\epsilon_j^-}\right)^2 = 0$$

In this further reformulation of Equation (19), each term may be independent and normally distributed when exponentiated. Dropping the + and − signs, Equation (19) may be simplified as Equation (20) below. As shown in Equation (20), the weight update $\Delta w_{ij}$ for any weight may be reduced to drawing from a Gaussian distribution.

$$e^{-\beta H_j^T} = \prod_i e^{-\beta e_{ij}^2 (\Delta w_{ij} - \delta_j/\epsilon_j)^2} \quad (20)$$

Because each weight may be connected to two nodes, a single weight may be updated by both nodes. Accordingly, Equation (21) below expresses the update of any single weight in the thermodynamic neural network 100.

$$H_{ij}(\Delta w_{ij}) = H_j^T(\Delta w_{ij}) + H_i^T(\Delta w_{ij}) = e_i^2 \cdot \left(\Delta w_{ij} - \frac{\delta_j}{\epsilon_j}\right)^2 + e_j^2 \cdot \left(\Delta w_{ij} - \frac{\delta_i}{\epsilon_i}\right)^2 \quad (21)$$

The ± superscripts may be dropped from Equation (21) in order to simplify the notation. Moreover, by completing the squares, Equation (21) may be reformulated as follows:

$$H_{ij}(\Delta w_{ij}) = \left(e_i^2 + e_j^2\right) \cdot \left(\Delta w_{ij} - \frac{1}{\left(e_i^2 + e_j^2\right)}\left(e_i^2 \cdot \frac{\delta_j}{\epsilon_j} + e_j^2 \cdot \frac{\delta_i}{\epsilon_i}\right)\right)^2 + \text{constants}$$

The reformulation of Equation (21) shows that the updates to a weight in the thermodynamic neural network 100 may be a compromise of the errors on the two nodes interconnected by the edge associated with the weight. As noted, in practice, techniques such as Markov Chain Monte Carlo may be applied to sample the state of the thermodynamic neural network 100. Based on an evaluation of the conditional distributions generating the weight updates, weight updates may be applied across individual nodes independently while assuming a strong decision for the state updates at each node (e.g., a clear decision between ±1) in order to avoid relaxing the values of the weights towards zero. Equations (22) and (23) below express weight updates that are applied in accordance with these principles. As Equations (22) and (23) show, the updates to the weights of the thermodynamic neural network 100 may exhibit a Gaussian distribution.

$$H_{ij}(\Delta w_{ij}) \cong \left(\Delta w_{ij} - \frac{1}{2} \cdot \frac{\delta_j}{\epsilon_j}\right)^2 + \left(\Delta w_{ij} - \frac{1}{2} \cdot \frac{\delta_i}{\epsilon_i}\right)^2 \quad (22)$$

$$P_{j(i)}(\Delta w_{ij} \mid e, w) \sim e^{-\beta\left(\Delta w_{ij} - \frac{1}{2} \cdot \frac{\delta_{j(i)}}{\epsilon_{j(i)}}\right)^2} \quad (23)$$

Although simple, the weight update paradigm expressed in Equations (22) and (23) above may exhibit a tendency for uncontrolled weight growth. This undesirable artifact may be mitigated by at least reducing the magnitude of each (independent) weight update. For example, the collection of weights associated with the node i may be expressed as a vector $\vec{w}_i$. The effect of updating each weight in the vector $\vec{w}_i$ independently may be to, on average, increase the magnitude $|\vec{w}_i|$ as shown in Equation (24) below.

$$\left\langle(\vec{w}_i + (\overrightarrow{\Delta w})_i)^2\right\rangle = \vec{w}_i^2 + 2\cdot\langle\vec{w}_i\cdot\overrightarrow{\Delta w}_i\rangle + \langle\overrightarrow{\Delta w}_i^2\rangle = \vec{w}_i^2 + \langle\overrightarrow{\Delta w}_i^2\rangle = \vec{w}_i^2 + \frac{n_i}{2\beta} > \vec{w}_i^2 \quad (24)$$

wherein $n_i$ may denote the quantity of edges connected to the node i.

To control the growth of the weights as each weight undergoes independent updates, the size of each weight associated with the node i may be reduced by multiplying each weight by a correction factor, as shown in Equation (25) below.

$$\vec{w}_i \to \vec{w}_i\cdot\left(\frac{1}{1+\langle\overrightarrow{\Delta w}_i^2\rangle/\vec{w}_i^2}\right)^{1/2} = \vec{w}_i\cdot\left(\frac{1}{1+n_i/(2\cdot\beta\cdot\vec{w}_i^2)}\right)^{1/2} \quad (25)$$

As shown in Equation (25), the magnitude of the correction may be inversely proportional to the magnitude of with $\vec{w}_i^{\,2}$ (e.g., the correction may decrease as $\vec{w}_i^{\,2}$ increases but increase as $\vec{w}_i^{\,2}$ decreases). Although this correction may be implemented in various manners including, for example, in accordance with Equation (26) below.

$$\vec{w}_i \to \vec{w}_i\cdot e^{-(n_i/(\alpha\cdot\beta\cdot\vec{w}_i^2))} \quad (26)$$

wherein ~1<α<~4 may be used to tune the fluidity of the thermodynamic neural network 100 in its original state.

As the weights in the thermodynamic neural network 100 are updated to eliminate the error in the transfer of charges through the corresponding nodes, the charge that remaining at, for example, the node j may be updated to reflect the charge that is successfully transported through the node j. A low transfer charge error may be reflected as a correspondingly low residual charge remaining at the node j whereas a high transfer charge error may be reflected as a correspondingly high residual charge remaining at the node j Equations (27)-(30) below express the updates to the charge remaining at the node j subsequent an update to a weight update at the node j. In the case of a strong decision, these updates may either completely eliminate or completely retain the charge that remain at the node j (e.g., for integration with subsequent input charges at the node j).

$$q_j^{++} \to \left(\frac{1+e_j}{2}\right)\cdot q_j^{++} \quad (27)$$

$$q_j^{+-} \to \left(\frac{1+e_j}{2}\right)\cdot q_j^{+-} \quad (28)$$

$$q_j^{--} \to \left(\frac{1-e_j}{2}\right)\cdot q_j^{--} \quad (29)$$

-continued $$q_j^{-+} \to \left(\frac{1-e_j}{2}\right)\cdot q_j^{-+} \quad (30)$$

In some example embodiments, one or more additional terms may be added to the energy $H_j$ of the node j. For example, Equation (31) below expresses an inertia $$H_j^{\Delta e}$$

that may be added to account for a bias towards retaining the current state of the node j. That is, the inertia $$H_j^{\Delta e}$$

may impose a potential barrier against a transition to a different state. As shown in Equation (31) below, the inertia $$H_j^{\Delta e}$$

associated with the node j may be a function of a mass $m_{\Delta e}$ of the node j.

$$H_j^{\Delta e} = m_{\Delta e}[e_j(t) - e_j(t-1)]^2 = m_{\Delta e}\Delta e_j^2 \quad (31)$$

Equation (32) below expresses an inertia $$H_j^{\Delta w}$$

that may be added to account for a bias that slows down the updating of the weights of the node j. This inertia $$H_j^{\Delta w}$$

may correspond to a “learning rate” of the thermodynamic neural network 100. Moreover, as shown in Equation (32), the inertia $$H_j^{\Delta w}$$

associated with a weight may be a function of the mass $m_{\Delta w}$ of the weight.

$$H_j^{\Delta w} = m_{\Delta w}[w_{ij}(t) - w_{ij}(t-1)]^2 = m_{\Delta w}\Delta w_{ij}^2 \quad (32)$$

In some example embodiments, in order to slow weight growth, an additional term $$H_j^{w}$$

corresponding to a decay rate may be added to introduce a bias towards weights having small values. The term $$H_j^w$$

may be expressed as Equation (33) below, in which $m_w$ may denote the mass of the weight.

$$H_j^w = m_w w_{ij}^2 \quad (33)$$

As noted, a technique, such as Markov Chain Monte Carlo, may be applied to train the thermodynamic neural network 100 and determine an optimal organization (e.g., a combination of node states and edge weights) in which the energy of the thermodynamic neural network 100 (e.g., the collective energy of the nodes in the thermodynamic neural network 100) is at a minimum or below a threshold value. The organization of the thermodynamic neural network 100 may be optimized in two stages including a first state where the states of the nodes relax (reversibly) through multiple rounds of state updates and a second stage in which the states of the edges relax (irreversibly) through a single round of weight updates. Referring again to Equation (2), which expresses probability of the thermodynamic neural network 100 having a particular organization (e.g., combination of node states and edge weights), the updating to the organization of the thermodynamic neural network 100 may be performed in a round robin fashion. For example, using an Markov Chain Monte Carlo/Gibbs' sampling method, the state of the node j may be sampled in a round robin for several cycles from the distribution expressed by Equation (34) below.

$$P_j(e_j \mid w, q) = \frac{\exp(-\beta H_j(e_j \mid w, q))}{\Sigma_{e_j} \exp(-\beta H_j(e_j \mid w, q))} \quad (34)$$

After a state $e_j$ is selected, the states of the nodes connected to the node j may be updated by at least temporarily adjust the corresponding input charges. After several round robin cycles, the goal may be to achieve a sample that effectively represents the probability distribution of the entire thermodynamic neural network 100. Because the input charges entering the thermodynamic neural network 100 may be changing, the round robin technique may be a search for a collection of node states that are representative of a constantly shifting equilibrium state distribution. The expectation may be to achieve better samples by conducting more round robin cycles. For example, the quantity of cycles in the round robin may scale in accordance with the size of the thermodynamic neural network 100 (e.g., the quantity of nodes within the thermodynamic neural network 100) or the separation "size" of the external nodes biasing the thermodynamic neural network 100. The search may be "reversible" in the sense that the edge states are not updated in the process. That is, the probability distribution of the weights associated with the edges in the thermodynamic neural network may remain unchanged during the process of examining various state configurations. Because no energy is dissipated through changing weights, the same set of node states in the thermodynamic neural network 100 may be associated with the same energy. Accordingly, the round robin process may not introduce entropy into the thermodynamic neural network 100.

Once the node state relaxation process is complete, the organization of the thermodynamic neural network 100 may be further optimized by updating the weights of the edges and the residual charges remaining in the thermodynamic neural network 100. As noted, edge state relaxation may be accomplished in a single cycle through the nodes. The edge states may update more slowly than the node states in the sense that the node state relaxation process may require multiple cycles while the edge relaxation may occur a single cycle. Moreover, edge state relaxation may be irreversible in that the weights of the edges undergo irreversible change in order to dissipate the residual charges within the thermodynamic neural network 100.

FIG. 3 depicts a flowchart illustrating an example process 300 for implementing a thermodynamic neural network 100, in accordance with some example embodiments. Referring to FIGS. 1A-C, 2A-B, and 3, the process 300 may be performed to implement the thermodynamic neural network 100.

At 302, the thermodynamic neural network 100 may be trained by at least determining an optimal organization of the thermodynamic neural network 100 in which one or more charges are transferred through the thermodynamic neural network 100 with a minimum quantity of residual charge remaining at each of a plurality of nodes included in the thermodynamic neural network 100. For example, the thermodynamic neural network 100 may be trained by determining an optimal organization of the thermodynamic neural network 100, including a combination of node states and edge weights, for transferring one or more input charges through the thermodynamic neural network 100. The one or more input charges may enter the thermodynamic neural network 100 at one or more bias nodes (e.g., current biasing nodes, voltage biasing nodes, and/or the like) within the thermodynamic neural network 100 that are coupled with external nodes from which the input charges originate. In some example embodiments, the optimal organization of the thermodynamic neural network 100 may be determined by updating the states of the nodes in the thermodynamic neural network 100 to maximize the transfer of complementary charges (e.g., the transfer of opposite charges in opposite directions). Moreover, the updating optimal organization of the thermodynamic neural network 100 may be determined by updating the weights of the edges interconnecting the nodes to minimize the residual charges that remain at the nodes after the transfer of complementary charges.

At 304, the trained thermodynamic neural network 100 may be deployed to perform a cognitive task in which a first set of charges corresponding to an input sample is transferred through the trained thermodynamic neural network 100 and a second set of charges corresponding to a decision associated with the input sample is output by the trained thermodynamic neural network 100. In some example embodiments, the thermodynamic neural network 100 may be trained to perform a variety of cognitive tasks including, for example, classification tasks, regression tasks, and/or the like. Accordingly, once trained, the thermodynamic neural network 100 may receive, from one or more external nodes, a first set of input charges corresponding to an input sample such as, for example, an image, a word string, and/or the like. Moreover, the trained thermodynamic neural network 100, which may exhibit an optimal organization, may output a second set of charges in response to the transfer of the first set of charges through the thermodynamic neural network

100. The second set of charges may correspond to a decision made by the thermodynamic neural network 100 with respect to the input sample. For example, the second set of charges output by the trained thermodynamic neural network 100 may correspond to a classification label or a predicted value associated with the input sample.

FIGS. 4A-E depicts simulations of an example of the thermodynamic neural network 100, in accordance with some example embodiments. The simulations shown in FIG. 4A-E may be performed on a 2-dimensional example of the thermodynamic neural network 100 having 900 nodes, each of which being interconnected to four nearest neighboring nodes. The various state of the individual nodes in each simulation of the thermodynamic neural network 100 are depicted in corresponding grayscale. In FIGS. 4B-E, the antiferromagnetic order of adjacent nodes is displayed as ferromagnetic order by flipping the polarity of the display in a checkerboard pattern.

Figure 4A:
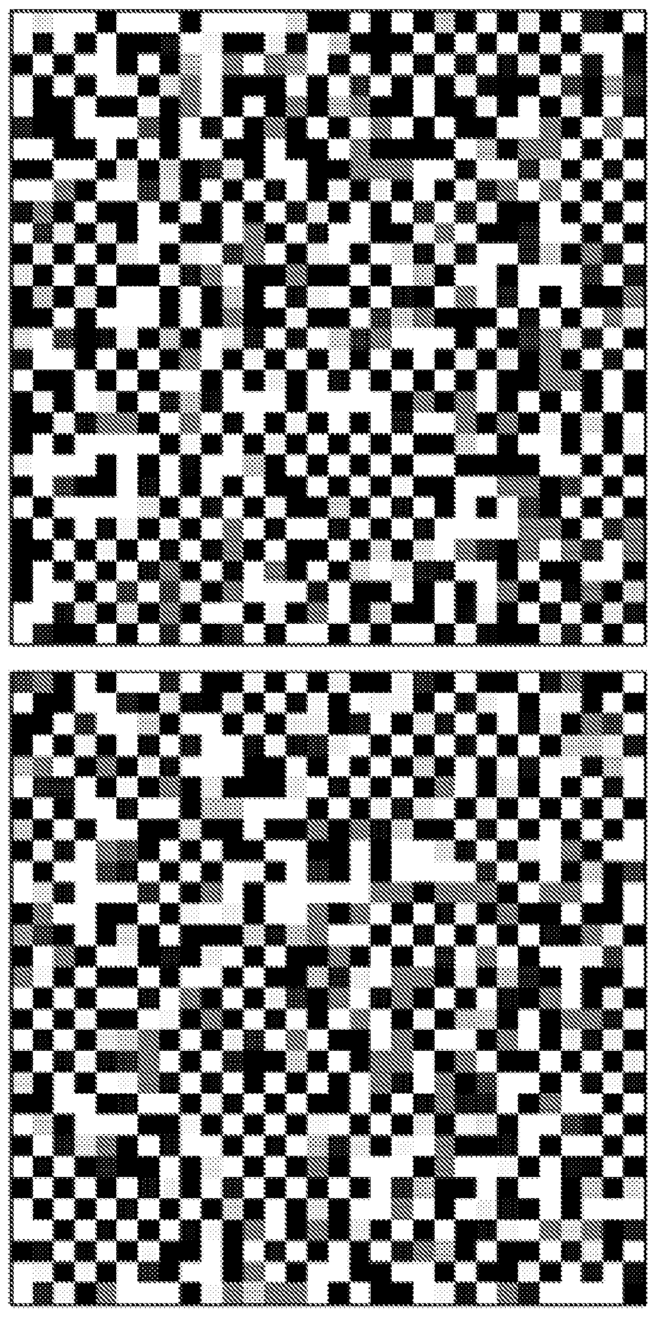
FIG. 4A depicts a simulation of an example of a thermodynamic neural network, in accordance with some example embodiments.
Figure 4B:
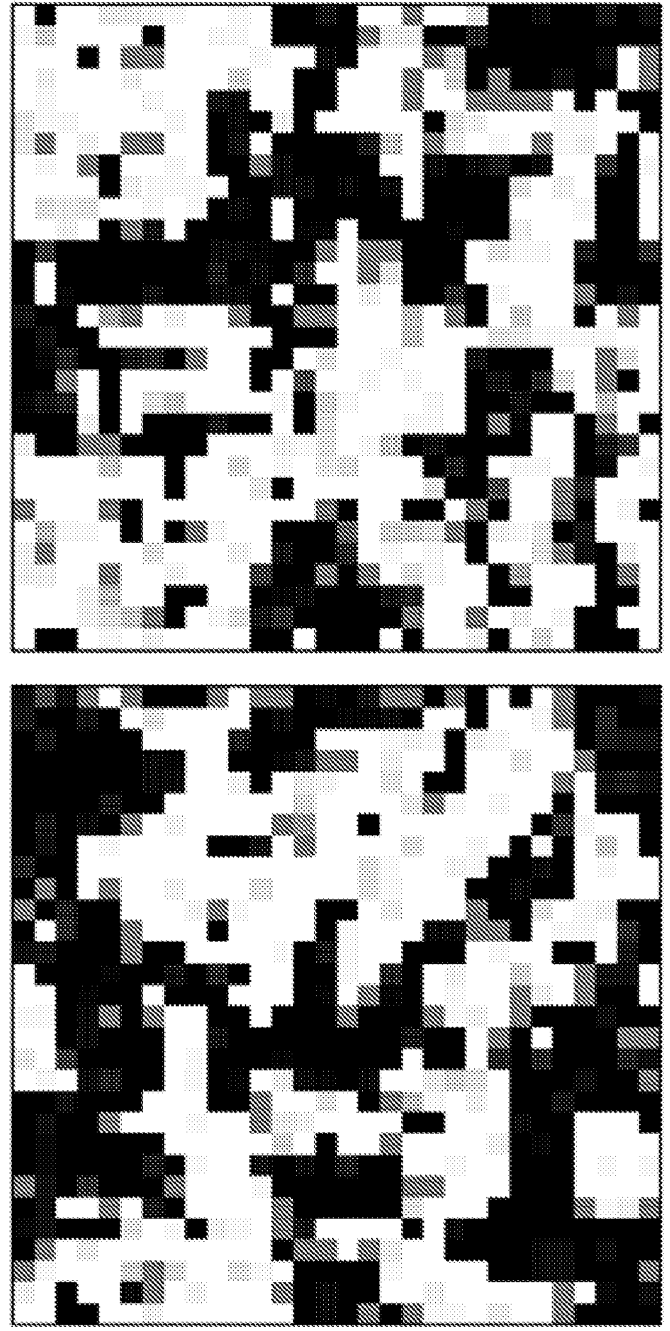
FIG. 4B depicts another simulation of an example of a thermodynamic neural network, in accordance with some example embodiments.

In the simulations shown in FIGS. 4A-B, the thermodynamic neural network 100 may operate without external biasing (e.g., input charges from external nodes outside of the thermodynamic neural network 100). As shown in FIGS. 4A-B, in the absence of external biasing, the nodes in the thermodynamic neural network 100 may form an asymmetric or antiferromagnetic network configuration favoring the interconnection of nodes having opposite polarities. The nodes in the thermodynamic neural network 100 may therefore be partitioned (e.g., bi-partitioned in the example shown in FIGS. 4A-B) such that interconnections may exist between nodes occupying different partitions but not between nodes occupying the same partition.

Figure 4C:
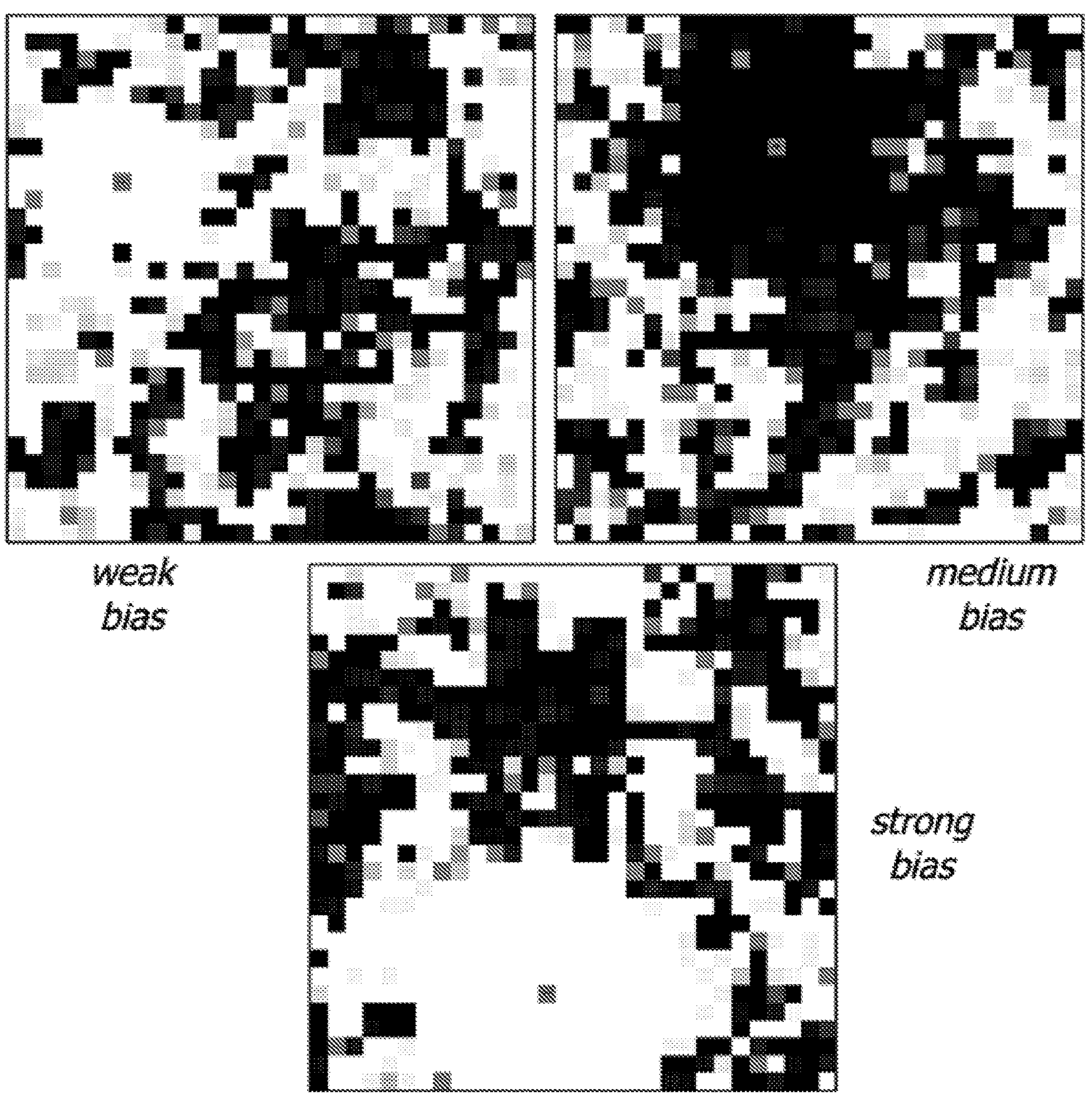
FIG. 4C depicts another simulation of an example of a thermodynamic neural network, in accordance with some example embodiments.
Figure 4E:
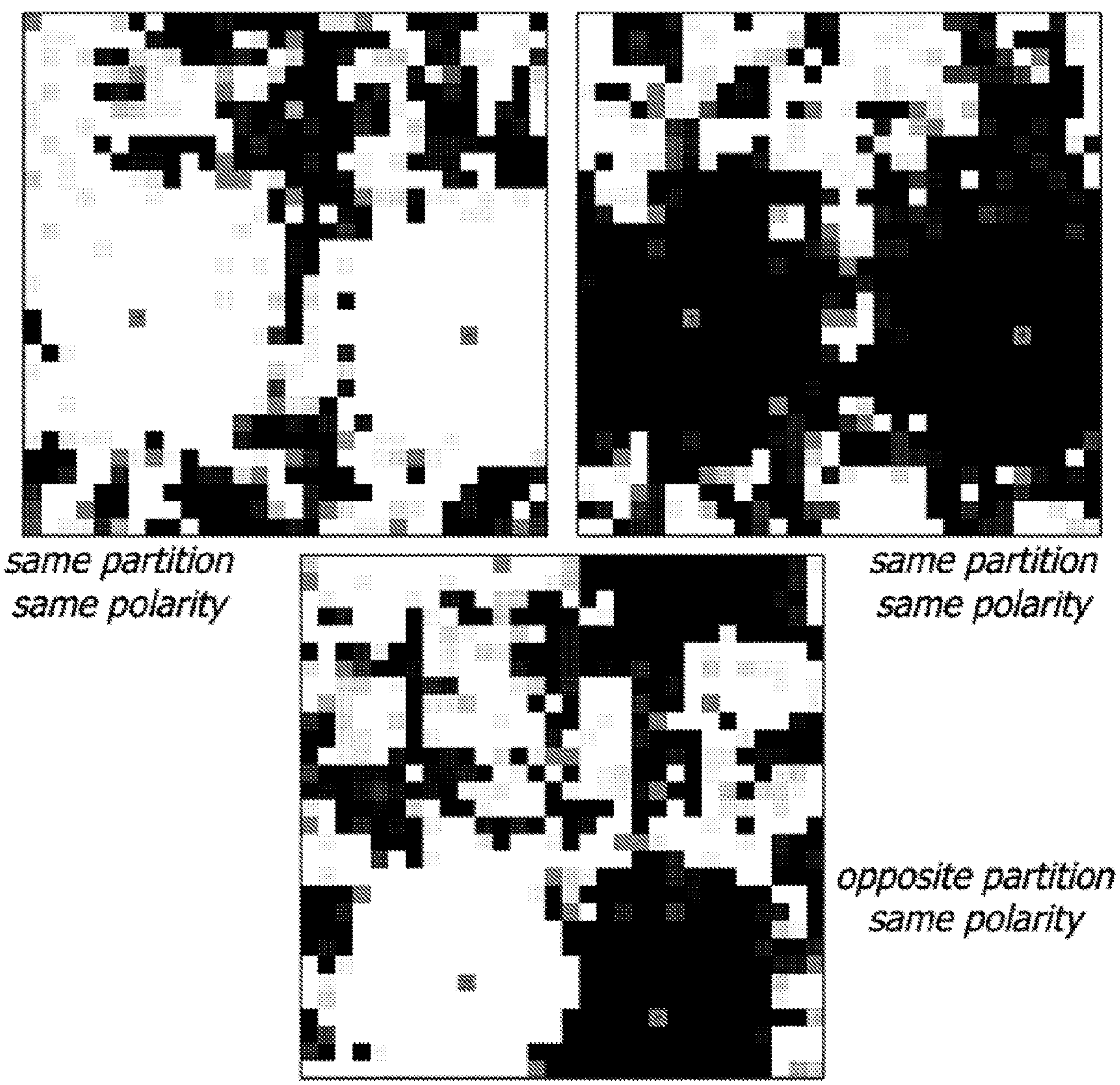
FIG. 4E depicts another simulation of an example of a thermodynamic neural network, in accordance with some example embodiments.

FIGS. 4C-E depicts simulations of the thermodynamic neural network 100 in which the thermodynamic neural network 100 is subject to external biasing (e.g., input charges from external nodes outside of the thermodynamic neural network 100). For example, FIG. 4C depicts the effects of varying the strength of an external bias applied to a single node within the thermodynamic neural network 100. As shown in FIG. 4C, the degree of polarization exhibited by the thermodynamic neural network 100 (e.g., the presence of nodes having opposite polarities) in response to the external bias may be directly proportional to the strength of the external bias.

FIG. 4D depicts simulations in which two nodes within the thermodynamic neural network 100 are subject to external biases of opposite polarities. As shown in FIG. 4D, the thermodynamic neural network 100 may exhibit a higher degree of polarization when the two nodes subject to the external biases of opposite polarities also occupy opposite partitions. The polarization of the thermodynamic neural network 100 may be comparatively lower when the two nodes subject to the external biases of opposite polarities occupy the same partition.

FIG. 4E depicts simulations in which two nodes within the thermodynamic neural network 100 are subject to external biases of a same polarity. As shown in FIG. 4E, the thermodynamic neural network 100 may exhibit a higher degree of polarization when the two nodes subject to the external biases of the same polarity occupy the same partition. The polarization of the thermodynamic neural network 100 may be comparatively lower when the two nodes subject to the external biases of the same polarity occupy opposite partitions.

The foregoing simulations of the thermodynamic neural network 100 may be performed on a desktop computer, which may not necessarily be refined for efficiency of execution or speed. As such, it should be appreciated that additional optimizations of the thermodynamic neural network 100 may be achieved by implementing the thermodynamic neural network 100 on computing architectures exhibiting high degrees of parallelism such as, for example, multi-core central processing units (CPUs), graphics processing units (GPUs), neuromorphic computing systems, and/or the like.

Further optimizations may be achieved by implementing the thermodynamic neural network 100 using electronic components having an intrinsic ability to perform the thermodynamic relaxation that drives the evolution of the thermodynamic neural network 100. For example, individual nodes in the thermodynamic neural network 100 might be constructed from multistate "memories" that are marginally stable at their operating temperature and which can be biased to favor transition to a particular state (e.g., static random access memory (SRAM) and/or the like) by the charge received from their inputs. Alternatively and/or additionally, the edges in the thermodynamic neural network 100 may be constructed from semi-stable, hysteretic resistive components (e.g., "memristors," "memcapacitors," and/or the like) whose electrical properties (e.g., resistance, capacitance, and/or the like) change in accordance with the history of the current passing through them. Such systems may exhibit orders of magnitude higher energy efficiency and scalability as well as offer more complex functionality than conventional computing systems.

Figure 5:
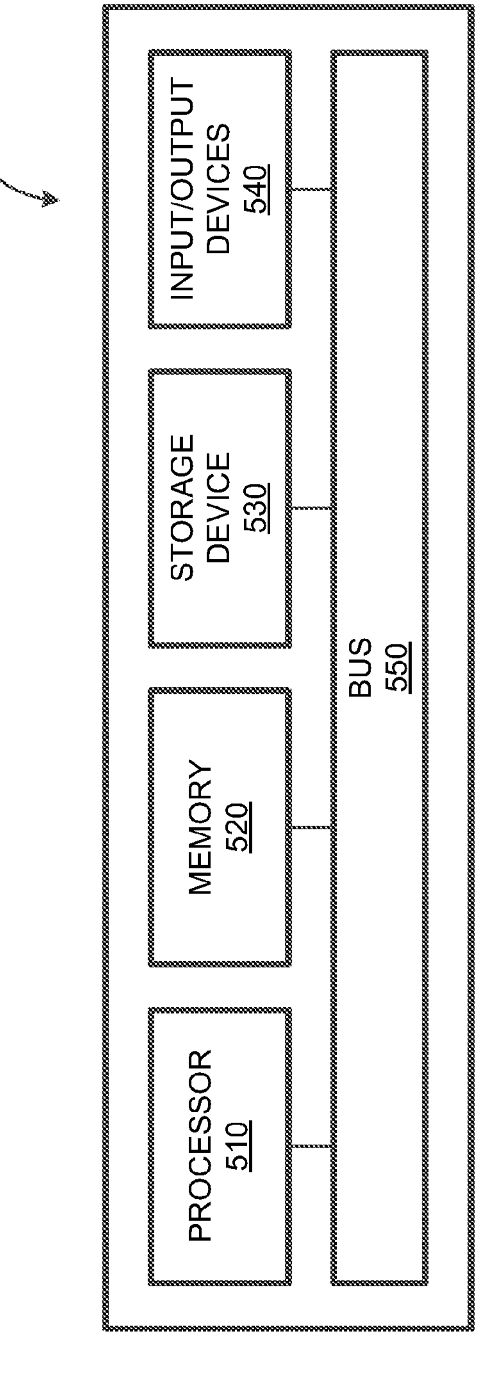
FIG. 5 depicts a block diagram illustrating a computing system, in accordance with some example embodiments.

FIG. 5 depicts a block diagram illustrating an example of a computing system 500 for implementing the thermodynamic neural network 100 and/or any components therein, in accordance with some example embodiments. As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the thermodynamic neural network 100. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:

at least one processor; and at least one memory including program code which when executed by the at least one processor provides operations comprising:

training a thermodynamic neural network having a plurality of nodes interconnected by a plurality of edges and a plurality of compartments, wherein the plurality of nodes comprises a first node configured to change state to transfer, via at least a portion of the plurality of edges and a portion of the plurality of compartments, a first charge at a second node to a third node, wherein the first node is coupled to the second node via at least a first edge and a first compartment, wherein the first edge is configured with a first weight indicative of a capacity of the first edge to transport the first charge from the second node to the third node via at least the first node, wherein the first node is coupled to the third node via at least a second edge and a second compartment, wherein the second edge is configured with a second weight indicative of a capacity of the second edge to transport a second charge from the third node to the second node via at least the first node, wherein the first compartment and the second compartment are configured to accumulate charges, wherein the training of the thermodynamic neural network further includes:

determining an optimal organization of the thermodynamic neural network in which one or more charges are transferred through the thermodynamic neural network with a minimum quantity of residual charge remaining at each of the plurality of nodes including the first node, the second node, and the third node, the optimal organization determined by at least adjusting the first weight and/or the second weight by at least performing a Markov Chain Monte Carlo sampling procedure including a round-robin update of states of the plurality of nodes, such that when a respective node is reached in the Markov Chain Monte Carlo sampling procedure, the state of the respective node is adjusted based on a Boltzmann distribution, wherein when the state of the second node is adjusted, at least one compartment coupled to the second node is selected and a portion of an accumulated charge at the at least one compartment is transferred via the first node to the third node; and deploying the trained thermodynamic neural network comprising the first node, the second node, and the third node to perform a task, the task including the trained thermodynamic neural network receiving a first set of charges corresponding to an input sample and outputting a second set of charges corresponding to a decision associated with the input sample.

2. The system of claim 1, wherein adjusting the first weight and/or the second weight comprises updating weights associated with edges corresponding to the selected at least one compartment while not updating at least one weight associated with at least one edge corresponding to an unselected compartment.

3. The system of claim 2, wherein the optimal organization is determined by at least determining a state of the first node, wherein the first charge from the second node and the second charge from the third node are transferred through the first node when the first node is in a first state, and wherein a third charge from a fourth node and a fourth charge from a fifth node are transferred through the first node when the first node is in a second state.

4. The system of claim 3, wherein the optimal organization includes the first node in the first state based at least on a first magnitude of the first charge and the second charge being greater than a second magnitude of the third charge and the fourth charge.

5. The system of claim 4, wherein the optimal organization includes the first node in the first state further based on the first charge and the second charge having opposite polarities.

6. The system of claim 4, wherein the optimal organization includes the first node in the first state further based at least on a first quantity of residual charges that remains after the transfer of the first charge and the second charge through the first node being less than a second quantity of residual charges that remains after the transfer of the third charge and the fourth charge through the first node.

7. The system of claim 6, wherein the first quantity of residual charges is determined based at least on the first weight and/or the second weight, wherein the first weight is associated with the first edge of the plurality of edges that interconnects the first node and the second node, and the second weight is associated with the second edge of the plurality of edges that interconnects the first node and the third node.

8. The system of claim 7, wherein the first charge corresponds to a first product of the first weight and a state of the second node, wherein the second charge corresponds to a second product of the second weight and a state of the third node, and wherein the first quantity of residual charges includes a first portion of the first charge and/or a second portion of the second charge that failed to transfer through the first node.

9. The system of claim 7, wherein the optimal organization of the thermodynamic neural network is further determined by at least adjusting, based at least on the first quantity of residual charges, the first weight and/or the second weight.

10. The system of claim 9, wherein the first weight and the second weight are adjusted independently.

11. The system of claim 9, wherein the adjusting of the first weight and/or the second weight includes decreasing a magnitude of the first weight and/or the second weight by multiplying the first weight and/or the second weight by a correction factor.

12. The system of claim 9, wherein the first quantity of residual charges comprises an error that is minimized by the adjusting of the first weight and/or the second weight.

13. The system of claim 12, wherein the first weight and/or the second weight are adjusted such that a distribution of weights across the thermodynamic neural network conforms to the Boltzmann distribution.

14. The system of claim 12, wherein the error is minimized without adjusting a third weight associated with a third edge interconnecting the first node and a fourth node or a fourth weight associated with a fourth edge interconnecting the first node and a fifth node.

15. The system of claim 1, wherein the optimal organization of the thermodynamic neural network is determined by at least applying the Markov Chain Monte Carlo sampling procedure to change a respective state of each of the plurality of nodes in the thermodynamic neural network until the respective states of the plurality of nodes conform to the Boltzmann distribution.

16. The system of claim 1, wherein the plurality of nodes comprising the thermodynamic neural network includes at least one node that is coupled to an external node providing the first set of charges.

17. The system of claim 1, wherein the plurality of nodes comprising the thermodynamic neural network includes at least one node that is coupled to an external node receiving the second set of charges.

18. The system of claim 1, wherein the optimal organization of the thermodynamic neural network comprises an antiferromagnetic network configuration interconnecting nodes having opposite polarities.

19. A computer-implemented method, comprising:

training a thermodynamic neural network having a plurality of nodes interconnected by a plurality of edges and a plurality of compartments, wherein the plurality of nodes comprises a first node configured to change state to transfer, via at least a portion of the plurality of edges and a portion of the plurality of compartments, a first charge at a second node to third node, wherein the first node is coupled to the second node via at least a first edge and a first compartment, wherein the first edge is configured with a first weight indicative of a capacity of the first edge to transport the first charge from the second node to the third node via at least the first node, wherein the first node is coupled to the third node via at least a second edge and a second compartment, wherein the second edge is configured with a second weight indicative of a capacity of the second edge to transport a second charge from the third node to the second node via at least the first node, wherein the first compartment and the second compartment are configured to accumulate charges, wherein the training of the thermodynamic neural network further includes:

determining an optimal organization of the thermodynamic neural network in which one or more charges are transferred through the thermodynamic neural network with a minimum quantity of residual charge remaining at each of the plurality of nodes including the first node, the second node, and the third node, the optimal organization determined by at least adjusting the first weight and/or the second weight by at least performing a Markov Chain Monte Carlo sampling procedure including a round-robin update of states of the plurality of nodes, such that when a respective node is reached in the Markov Chain Monte Carlo sampling procedure, the state of the respective node is adjusted based on a Boltzmann distribution, wherein when the state of the second node is adjusted, at least one compartment coupled to the second node is selected and a portion of an accumulated charge at the at least one compartment is transferred via the first node to the third node; and deploying the trained thermodynamic neural network comprising the first node, the second node, and the third node to perform a task, the task including the trained thermodynamic neural network receiving a first set of charges corresponding to an input sample and outputting a second set of charges corresponding to a decision associated with the input sample.

20. A non-transitory computer readable medium storing instructions, which when executed by at least one data processor, result in operations comprising:

training a thermodynamic neural network having a plurality of nodes interconnected by a plurality of edges and a plurality of compartments, wherein the plurality of nodes comprises a first node configured to change state to transfer, via at least a portion of the plurality of edges and a portion of the plurality of compartments, a first charge at a second node to third node, wherein the first node is coupled to the second node via at least a first edge and a first compartment, wherein the first edge is configured with a first weight indicative of a capacity of the first edge to transport the first charge from the second node to the third node via at least the first node, wherein the first node is coupled to the third node via at least a second edge and a second compartment, wherein the second edge is configured with a second weight indicative of a capacity of the second edge to transport a second charge from the third node to the second node via at least the first node, wherein the first compartment and the second compartment are configured to accumulate charges, wherein the training of the thermodynamic neural network further includes:

determining an optimal organization of the thermodynamic neural network in which one or more charges are transferred through the thermodynamic neural network with a minimum quantity of residual charge remaining at each of the plurality of nodes including the first node, the second node, and the third node, the optimal organization determined by at least adjusting the first weight and/or the second weight by at least performing a Markov Chain Monte Carlo sampling procedure including a round-robin update of states of the plurality of nodes, such that when a respective node is reached in the Markov Chain Monte Carlo sampling procedure, the state of the respective node is adjusted based on a Boltzmann distribution, wherein when the state of the second node is adjusted, at least one compartment coupled to the second node is selected and a portion of an accumulated charge at the at least one compartment is transferred via the first node to the third node; and deploying the trained thermodynamic neural network comprising the first node, the second node, and the third node to perform a task, the task including the trained thermodynamic neural network receiving a first set of charges corresponding to an input sample and outputting a second set of charges corresponding to a decision associated with the input sample.

* * * * *